(12) United States Patent
Singh et al.

(10) Patent No.: US 11,979,889 B2
(45) Date of Patent: May 7, 2024

(54) RELIABILITY ENHANCEMENT FOR USER EQUIPMENT WITH PARTIAL REPETITIONS IN CONFIGURED GRANT

(71) Applicant: Telefonaktiebolaget LM Ericsson (publ), Stockholm (SE)

(72) Inventors: Bikramjit Singh, Kirkkonummi (FI); Yufei Blankenship, Kildeer, IL (US); Majid Gerami, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 445 days.

(21) Appl. No.: 17/431,317

(22) PCT Filed: Feb. 13, 2020

(86) PCT No.: PCT/SE2020/050155
§ 371 (c)(1),
(2) Date: Aug. 16, 2021

(87) PCT Pub. No.: WO2020/167229
PCT Pub. Date: Aug. 20, 2020

(65) Prior Publication Data
US 2022/0167393 A1  May 26, 2022

Related U.S. Application Data

(60) Provisional application No. 62/806,552, filed on Feb. 15, 2019.

(51) Int. Cl.
*H04W 72/23* (2023.01)
*H04L 1/1812* (2023.01)

(52) U.S. Cl.
CPC ........... *H04W 72/23* (2023.01); *H04L 1/1812* (2013.01)

(58) Field of Classification Search
CPC .............................. H04W 72/23; H04L 1/1812
See application file for complete search history.

(56) References Cited

U.S. PATENT DOCUMENTS

2020/0100279 A1* 3/2020 Al-Imari ............... H04L 5/0073

FOREIGN PATENT DOCUMENTS

| WO | 2020091681 A1 | 5/2020 |
|----|---------------|--------|
| WO | 2020144015 A1 | 7/2020 |

OTHER PUBLICATIONS

Author Unknown, "Technical Specification Group Services and System Aspects; Study on Communication for Automation in Vertical Domains (Release 16)," Technical Report 22.804, Version 16.1.0, 3GPP Organizational Partners, Sep. 2018, 189 pages.

(Continued)

*Primary Examiner* — Natasha W Cosme
(74) *Attorney, Agent, or Firm* — Withrow & Terranova, PLLC

(57) ABSTRACT

Methods and systems for reliability enhancement for User Equipment (UE) with partial repetitions in Configured Grant (CG) are provided. According to one aspect, a method, performed by a UE in a Fifth Generation (5G) network, comprises: receiving data to be transmitted as uplink (UL) transmissions in CG resources K number of times within a CG period; determining that the number of Transmission Occasions (TOs) remaining within the CG resources and within the CG period for the UE is less than K; and either: transmitting the data within the remaining TOs within the CG resources and also within TOs within shared resources such that the transmission is performed at least K number of times; waiting until the beginning of the next CG period to transmit K number of times within the CG resources; or transmitting the data within the remaining TOs within the CG resources with an increased power.

19 Claims, 20 Drawing Sheets

*CG resource and shared resource use the same CG period boundary*

(56) References Cited

OTHER PUBLICATIONS

Author Unknown, "Technical Specification Group Services and System Aspects; Service requirements for the 5G System; Stage 1 (Release 16)," Technical Specification 22.261, Version 16.5.0, 3GPP Organizational Partners, Sep. 2018, 67 pages.
Author Unknown, "Technical Specification Group Radio Access Network; NR; Multiplexing and channel coding (Release 15)," Technical Specification 38.212, Version 15.4.0, 3GPP Organizational Partners, Dec. 2018, 100 pages.
Author Unknown, "Technical Specification Group Radio Access Network; NR; Physical layer procedures for control (Release 15)," Technical Specification 38.213, Version 15.4.0, 3GPP Organizational Partners, Dec. 2018, 104 pages.
Author Unknown, "Technical Specification Group Radio Access Network; NR; Physical layer procedures for data (Release 15)," Technical Specification 38.214, Version 15.3.0, 3GPP Organizational Partners, Sep. 2018, 96 pages.
Author Unknown, "Technical Specification Group Radio Access Network; NR; Medium Access Control (MAC) protocol specification (Release 15)," Technical Specification 38.321, Version 15.4.0, 3GPP Organizational Partners, Dec. 2018, 77 pages.
Author Unknown, "Technical Specification Group Radio Access Network; NR; Radio Resource Control (RRC) protocol specification (Release 15)," Technical Specification 38.331, Version 15.3.0, 3GPP Organizational Partners, Sep. 2018, 445 pages.
Ericsson, "R1-1812162: Enhancement of Configured Grant for NR URLLC," Third Generation Partnership Project (3GPP), TSG-RAN1 Meeting #95, Nov. 12-16, 2018, 11 pages, Spokane, USA.
ETSI MCC, "R2-1801701: Report of 3GPP TSG RAN2#100 meeting, Reno, Nevada, USA," Third Generation Partnership Project (3GPP), TSG-RAN WG2 meeting #101, Feb. 26-Mar. 2, 2018, 212 pages, Athens, Greece.
LG Electronics, "R1-1812578: Discussion on enhancement for grant-free transmission," Third Generation Partnership Project (3GPP), TSG RAN WG1 Meeting #95, Nov. 12-16, 2018, 9 pages, Spokane, USA.
Mediatek Inc., "R1-1900213: Study and evaluation of configured-grant enhancements for URLLC," Third Generation Partnership Project (3GPP), TSG RAN WG1 Ad-Hoc Meeting 1901, Jan. 21-25, 2019, 8 pages, Taipei, Taiwan.
TCL Communication, "R1-1900353: URLLC Configured Grant with less than K Repetitions," Third Generation Partnership Project (3GPP), TSG RAN WG1 Meeting #AH1, Jan. 21-25, 2019, 4 pages, Taipei, Taiwan.
International Search Report and Written Opinion for International Patent Application No. PCT/SE2020/050155, dated May 18, 2020, 15 pages.

* cited by examiner

*CG resource and shared resource use the same CG period boundary*

Collision of two UE's repetitions in the shared resource

TOs are contiguous in the time domain

*Shared resource CG boundary is offset from CG resource CG period boundary*

Offset CG boundary within shared resource mitigates HARQ restrictions

*CG boundary for shared resource offset from CG resource; contiguous TOs*

*Rel-15 Compatible: only one TO allowed per slot*

Rel-15 Compatible: only one TO allowed per slot per HARQ process

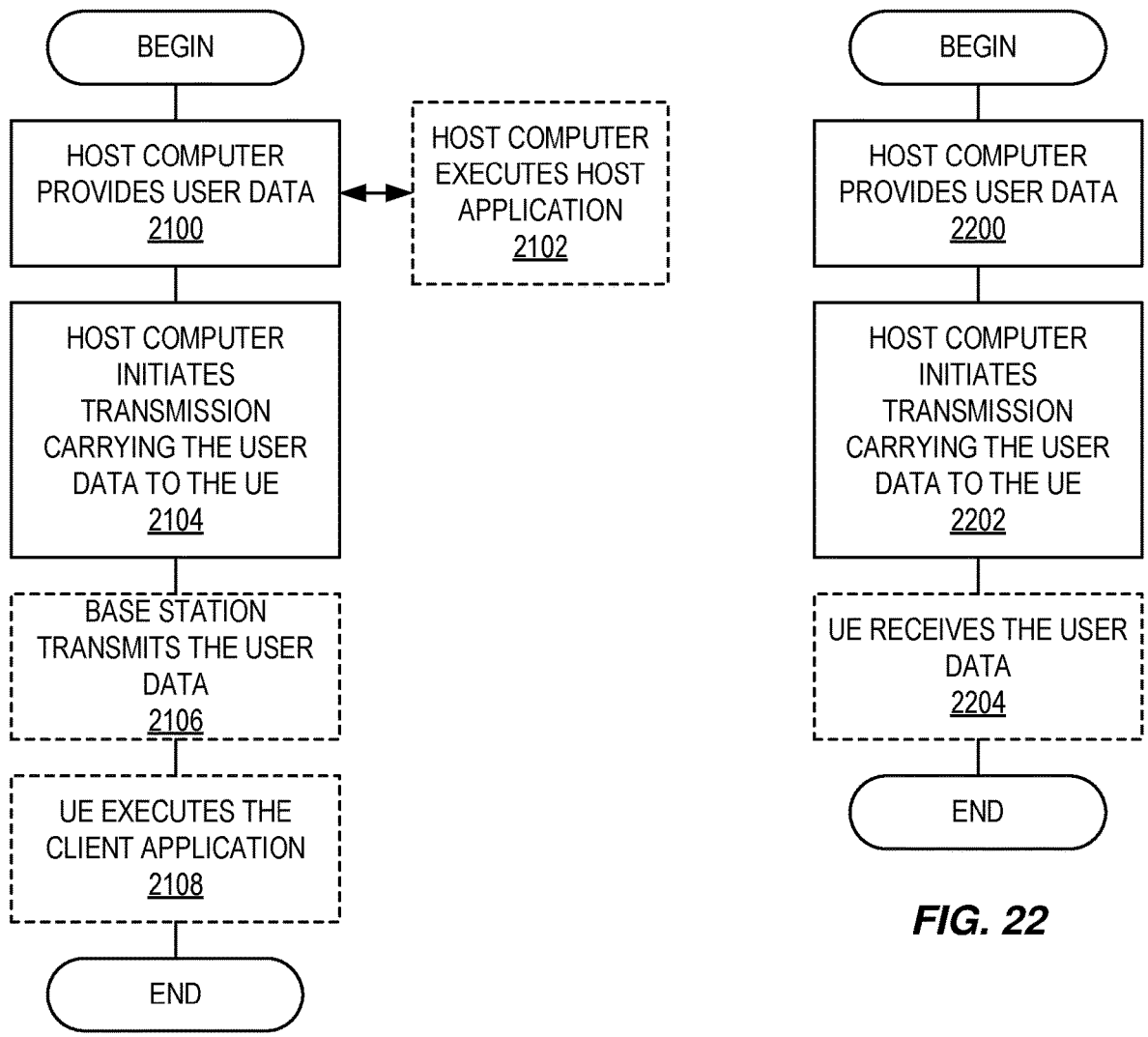

RELIABILITY ENHANCEMENT FOR USER EQUIPMENT WITH PARTIAL REPETITIONS IN CONFIGURED GRANT

RELATED APPLICATIONS

This application is a 35 U.S.C. § 371 national phase filing of International Application No. PCT/SE2020/050155, filed Feb. 13, 2020, which claims the benefit of provisional patent application Ser. No. 62/806,552, filed Feb. 15, 2019, the disclosures of which are hereby incorporated herein by reference in their entireties.

TECHNICAL FIELD

The present application relates to a cellular communications system and, more specifically, to Uplink (UL) transmissions within Configured Grant (CG) resources.

BACKGROUND

Fifth Generation (5G) telecommunication networks are planned to be introduced in the early 2020s, envisioning to address new services and use cases. These new services are not only for human interaction, but also a huge growth in Machine-Type Communications (MTC) driven by e.g., factory automation and flexible process control. Ultra-Reliable and Low-Latency Communications (URLLC) is one important enabler to support these new services.

The most stringent requirement on URLLC currently being studied in Third Generation Partnership Project (3GPP) Radio Access Network (RAN) Work Group is 99.999%-99.9999999% reliability under the radio latency bound of 1 ms [1][2]. The maximum packet error rate must not be higher than $10^{-5}$-$10^{-9}$, where maximum allowable radio latency, including retransmissions is down to 1 ms. With the new numerology consideration for 5G New Radio (NR), for example 0.125 ms Transmission Time Interval (TTI) size or even shorter mini-slot concept and each TTI contains both control and data information, there is a possibility to support Uplink (UL) Grant-Free (GF) transmissions with 1 ms latency.

The Configured Grant (CG) resource allocation allows the utilization of GF access which enables low latency access for URLLC provisioning [3]. To support extremely high reliability of order of, e.g., 99.9999% [1], or 99.9999999% for the case with Centralised Power Generation 4.9 [2], NR base station (gNB) has allowed the use of multiple K GF transmissions, Negative Acknowledgement (NACK) based feedback utilization for retransmission, new Modulation and Coding Scheme (MCS) table, Packet Data Convergence Protocol (PDCP) duplication, multi-Transmission/Reception Point (TRP), etc. [3][4].

NR supports two types of configured grants, Type 1 and Type 2. For Type 1 the User Equipment (UE) is Radio Resource Control (RRC) configured with a grant that indicate all needed transmission parameters while for Type 2 the configured grant is partly RRC configured and partly L1 signaled (Downlink Control Information (DCI) signaling). For Type 2 configured grant, the resource allocation follows a UL grant received on the DCI and the resource then recurs periodically whose period is configured by RRC. The UL grant has the time domain resource assignment field that provides a row index of a higher layer configured table pusch-symbolAllocation, where the indexed row defines the slot offset K2, the Start and Length Indicator Value (SLIV), and the Physical Uplink Shared Channel (PUSCH) mapping type to be applied in the PUSCH transmission. The UE transmits a Medium Access Control-Control Element (MAC-CE) confirm message when the configured grant is activated or deactivated.

The RRC ConfiguredGrantConfig information element is defined in 3GPP Technical Specification (TS) 38.331, as shown below according to 38.331 V15.3.0.

Begin excerpt of 3GPP TS 38.331

```
-- ASN1START
-- TAG-CONFIGUREDGRANTCONFIG-START
ConfiguredGrantConfig ::=SEQUENCE {
    frequencyHopping              ENUMERATED {intraSlot, interSlot},      OPTIONAL, Need S
    cg-DMRS-Configuration         DMRS-UplinkConfig,
    mcs-Table                     ENUMERATED {qam256, qam64LowSE},        OPTIONAL, Need S
    mcs-TableTransformPrecoder    ENUMERATED {qam256, qam64LowSE},        OPTIONAL, Need S
    uci-OnPUSCH                   SetupRelease { CG-UCI-OnPUSCH },        OPTIONAL, Need M
    resourceAllocation            ENUMERATED {
                                      resourceAllocationType0, resourceAllocationType1,
                                      dynamicSwitch
                                  },
    rbg-Size                      ENUMERATED {config2}                    OPTIONAL, Need S
    powerControlLoopToUse         ENUMERATED {n0, n1},
    p0-PUSCH-Alpha                P0-PUSCH-AlphaSetId,
    transformPrecoder             ENUMERATED {enabled, disabled},         OPTIONAL, Need S
    nrofHARQ-Processes            INTEGER(1..16),
    repK                          ENUMERATED {n1, n2, n4, n8},
    repK-RV                       ENUMERATED {
                                      s1-0231, s2-0303, s3-0000
                                  },                                      OPTIONAL, Need R
    periodicity                   ENUMERATED {
                                      sym2, sym7, sym1x14, sym2x14, sym4x14, sym5x14,
                                      sym8x14, sym10x14, sym16x14, sym20x14, sym32x14,
                                      sym40x14, sym64x14, sym80x14, sym128x14, sym160x14,
                                      sym256x14, sym320x14, sym512x14, sym640x14,
                                      sym1024x14, sym1280x14, sym2560x14, sym5120x14,
                                      sym6, sym1x12, sym2x12, sym4x12, sym5x12, sym8x12,
                                      sym10x12, sym16x12, sym20x12, sym32x12, sym40x12,
```

| Begin excerpt of 3GPP TS 38.331 | | |
|---|---|---|
| | sym64x12, sym80x12, sym128x12, sym160x12, sym256x12, sym320x12, sym512x12, sym640x12, sym1280x12, sym2560x12 }, | |
| configuredGrantTimer | INTEGER (1..64), | OPTIONAL, Need R |
| rrc-ConfiguredUplinkGrant | SEQUENCE { | |
|   timeDomainOffset | INTEGER (0..5119), | |
|   timeDomainAllocation | INTEGER (0..15), | |
|   frequencyDomainAllocation | BIT STRING (SIZE(18)), | |
|   antennaPort | INTEGER (0..31), | |
|   dmrs-SeqInitialization | INTEGER (0..1), | OPTIONAL, Need R |
|   precodingAndNumberOfLayers | INTEGER (0..63), | |
|   srs-ResourceIndicator | INTEGER (0..15), | OPTIONAL, Need R |
|   mcsAndTBS | INTEGER (0..31), | |
|   pathlossReferenceIndex | INTEGER (0..maxNrofPUSCH-PathlossReferenceRSs-1), | |
|   frequencyHoppingOffset | INTEGER (1..maxNrofPhysicalResourceBlocks-1) | |
| | | OPTIONAL, Need R |
| | ... | |
| | } | OPTIONAL, Need R |
| ... | | |
| } | | |
| CG-UCI-OnPUSCH ::= CHOICE { | | |
|   dynamic | SEQUENCE (SIZE (1..4)) OF BetaOffsets, | |
|   semiStatic | BetaOffsets | |
| } | | |

| ConfiguredGrantConfig field descriptions |
|---|
| antennaPort |
| Indicates the antenna port(s) to be used for this configuration, and the maximum bitwidth is 5. See TS 38.214, section 6.1.2, and TS 38.212, section 7.3.1. |
| cg-DMRS-Configuration |
| DMRS configuration, corresponds to L1 parameter 'UL-TWG-DMRS'(see TS 38.214, section 6.1.2). |
| configuredGrantTimer |
| Indicates the initial value of the configured grant timer (see TS 38.321,) in number of periodicities. |
| dmrs-SeqInitialization |
| The network configures this field if transformPrecoder is disabled. Otherwise the field is absent. |
| frequencyDomainAllocation |
| Indicates the frequency domain resource allocation, see TS 38.214, section 6.1.2, and TS 38.212, section 7.3.1). |
| frequencyHopping |
| The value intraSlot enables 'Intra-slot frequency hopping' and the value interSlot enables 'Inter-slot frequency hopping'. If the field is absent, frequency hopping is not configured. |
| frequencyHoppingOffset |
| Enables intra-slot frequency hopping with the given frequency hopping offset. Frequency hopping offset used when frequency hopping is enabled. Corresponds to L1 parameter 'Frequency-hopping-offset'(see TS 38.214, section 6.1.2). |
| mcs-Table |
| Indicates the MCS table the UE shall use for PUSCH without transform precoding. If the field is absent the UE applies the value 64QAM. |
| mcs-TableTransformPrecoder |
| Indicates the MCS table the UE shall use for PUSCH with transform precoding. If the field is absent the UE applies the value 64QAM. |
| mcsAndTBS |
| The modulation order, target code rate and TB size (see T538.214, section 6.1.2). The NW does not configure the values 28~31 in this version of the specification. |
| nrofHARQ-Processes |
| The number of HARQ processes configured. It applies for both Type 1 and Type 2. See TS 38.321, section 5.4.1. |
| p0-PUSCH-Alpha |
| Index of the P0-PUSCH-AlphaSet to be used for this configuration. |

-continued

ConfiguredGrantConfig field descriptions periodicity

Periodicity for UL transmission without UL grant for type 1 and type 2. Corresponds to L1 parameter 'UL-TWG periodicity' (see TS 38.321, section 5.8.2).
The following periodicities are supported depending on the configured subcarrier spacing [symbols]:
15 kHz: 2, 7, n* 14,
   where n = {1, 2, 4, 5, 8, 10, 16, 20, 32, 40, 64, 80, 128, 160, 320, 640}
30 kHz: 2, 7, n* 14,
   where n = {1, 2, 4, 5, 8, 10, 16, 20, 32, 40, 64, 80, 128, 160, 256, 320, 640, 1280}
60 kHz with normal CP: 2,7, n*14,
   where n = {1, 2, 4, 5, 8, 10, 16, 20, 32, 40, 64, 80, 128, 160, 256, 320, 512, 640, 1280, 2560}
60 kHz with ECP: 2,6, n*12,
   where n = {1, 2, 4, 5, 8, 10, 16, 20, 32, 40, 64, 80, 128, 160, 256, 320, 512, 640, 1280, 2560}
120 kHz: 2,7, n* 14,
   where n = {1, 2, 4, 5, 8, 10, 16, 20, 32, 40, 64, 80, 128, 160, 256, 320, 512, 640, 1024, 1280, 2560, 5120}
(see 38.214, Table 6.1.2.3-1)
powerControlLoopToUse Closed control loop to apply. Corresponds to L1 parameter 'PUSCH-closed-loop-index'(see TS 38.213, section 7.7.1).
rbg-Size Selection between configuration 1 and configuration 2 for RBG size for PUSCH. When the field is absent the UE applies the value config1. The NW may only set the field to con11g2 if resourceAllocation is set to resourceAllocationType0 or dynamic5Witch. Note: rbg-Size is used when the transformPrecoder parameter is disabled.
repK-RV The redundancy version (RV) sequence to use. See TS 38.214, section 6.1.2. The network configures this field if repetitions are used, i.e., if repK is set to n2, n4 or n8. Otherwise, the field is absent.
repK The number or repetitions of K.
resourceAllocation Configuration of resource allocation type 0 and resource allocation type 1. For Type 1 UL data transmission without grant, "resourceAllocation" should be resourceAllocationType0 or resourceAllocationType1.
rrc-ConfiguredUplinkGrant Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously.
srs-ResourceIndicator Indicates the SRS resource to be used.
timeDomainAllocation Indicates a combination of start symbol and length and PUSCH mapping type, see TS 38.214, section 6.1.2 and TS 38.212, section 7.3.1.
timeDomainOffset Offset related to SFN = 0, see TS 38.321, section 5.8.2.
transformPrecoder Enables or disables transform precoding for type1 and type2. If the field is absent, the UE enables or disables transform precoding in accordance with the field msg3-transformPrecoder in RACH-ConfigCommon, see 38.214, section 6.1.3.
uci-OnPUSCH Selection between and configuration of dynamic and semi-static beta-offset. For Type 1 UL data transmission without grant, uci-OnPUSCH should be set to semiStatic.
End excerpt of 3GPP TS 38.331

Note that the 3GPP TS uses the term "repetitions" to mean "the total number of transmissions" rather than "the number of additional transmissions after the first transmission." Thus, as used herein, the phrases "K repetitions" and "K transmissions" are synonymous.

SUMMARY

There currently exist certain challenges. To have low latency access for Uplink (UL) Ultra-Reliable and Low-Latency Communications (URLLC), Third Generation Partnership Project (3GPP) has agreed to support Grant-Free (GF) or Semi-Persistent Scheduling (SPS) transmissions in the form of Configured Grant (CG) [2]. Further, K repetitions are utilized to ensure reliable transmission. In CG, K repetitions should in a period provide K transmission occasions (which may also be referred to as transmission opportunities) for a transport block of a given Hybrid Automatic Repeat Request (HARQ) process [5]. However, if some transmission occasions are missed, then actual repetition may be less than K, which may affect the reliability.

Some proposed solutions have been considered, such as (a) multiple CGs usage [5], and (b) allowing crossing of boundary [5]. However, both solutions have certain disadvantages. The proposal in (a) ensures K repetitions by over allocating the expensive spectrum resource in the form of multiple CGs. Whereas solution (b) requires multiple signatures to differentiate between old and new HARQ process within a period.

Certain aspects of the present disclosure and their embodiments may provide solutions to the aforementioned or other challenges. In the present disclosure, enhancements to GF services with CG are presented.

According to one aspect of the present disclosure, a method performed by a User Equipment (UE) for operating in a Fifth Generation (5G) network comprises receiving data to be transmitted as a UL transmission in CG resources, the data to be transmitted K number of times within a CG period, determining that the number of Transmission Occasions (TOs), remaining within the CG resources and within the CG period for the UE is less than K, and either: transmitting the data within the remaining TOs within the CG resources and also transmitting the data within TOs within shared resources such that the transmission is performed K number of times (or more, if the shared resources have lower reliability); or waiting until the beginning of the next CG period to transmit K number of times within the CG resources; or transmitting the data within the remaining TOs within the CG resources with an increased power.

In some embodiments, the method further comprises, upon determining that that the number of TOs remaining within the CG resources and within a CG period for the UE is less than K, transmitting the data within the remaining TOs within the CG resources and also transmitting the data within TOs within shared resources such that the data is transmitted K number of times.

In some embodiments, the CG period for the shared resources is either aligned with the CG period for the CG resources or offset or delayed in time relative to the CG period for the CG resources.

In some embodiments, the TOs within the CG resources and the shared resources are contiguous with each other in the time domain, or are not contiguous with each other in the time domain.

In some embodiments, there is only one TO per time slot per HARQ process.

In some embodiments, the CG period for the shared resources is offset relative to the CG period for the CG resources.

In some embodiments, the CG period for the shared resources does not begin until on or after the end of the CG period for the CG resources.

In some embodiments, determining that that the number of TOs remaining within the CG resources and within a CG period for the UE is less than K further comprises determining that the number of TOs remaining within the CG resources and within a CG period for the UE is less than a threshold T.

In some embodiments, the method further comprises, upon determining that the number of TOs remaining within the CG resources and within a CG period for the UE is a value K' that is less than K, transmitting the data within the remaining TOs within the CG resources with an increased power.

In some embodiments, the UE calculates a transmission power on at least one CG resource based on the values of K and K'.

In some embodiments, the method further comprises also transmitting the data within TOs within shared resources.

According to another aspect of the present disclosure, a method performed by a New Radio (NR) base station (gNB) comprises monitoring UL transmissions by a UE in CG resources, the data to be transmitted K number of times within a CG period, detecting that the UE is transmitting on CG resources, determining that a number of TOs within the CG resources and within a CG period for the UE for transmitting the data will be less than K, and monitoring a shared resource for GF transmissions of the data by the UE.

In some embodiments, the CG period for the shared resources is either aligned with the CG period for the CG resources or offset or delayed in time relative to the CG period for the CG resources.

In some embodiments, the TOs within the CG resources and the shared resources are contiguous with each other in the time domain or are not contiguous with each other in the time domain.

In some embodiments, there is only one TO per time slot per HARQ process.

In some embodiments, the CG period for the shared resources is offset relative to the CG period for the CG resources.

In some embodiments, the CG period for the shared resources does not begin until on or after the end of the CG period for the CG resources.

In some embodiments, determining that that the number of TOs within the CG resources and within a CG period for the UE will be less than K further comprises determining that the number of TOs remaining within the CG resources and within a CG period for the UE is less than a threshold T.

In some embodiments, the method further comprises determining whether to perform detection on the CG resources or on the shared resources based upon the value of T.

In some embodiments, the method further comprises detecting one or more GF transmissions of the data on the shared resource by the UE.

According to another aspect of the present disclosure, a wireless device for operating in a 5G network, the wireless device comprising processing circuitry configured to perform any of the steps of any of the wireless device methods disclosed herein, and power supply circuitry configured to supply power to the wireless device.

According to another aspect of the present disclosure, a base station operating in a 5G network, the base station comprising processing circuitry configured to perform any of the steps of any of the base station methods disclosed herein, and power supply circuitry configured to supply power to the base station.

According to another aspect of the present disclosure, a UE operating in a 5G network comprises: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the UE methods disclosed herein; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

According to another e aspect of the present disclosure, a communication system including a host computer comprising processing circuitry configured to provide user data, and a communication interface configured to forward the user data to a cellular network for transmission to a UE, wherein the cellular network comprises a base station having a radio interface and processing circuitry, the base station's processing circuitry configured to perform any of the steps of any of the base station methods disclosed herein.

In some embodiments, the communication system further includes the base station.

In some embodiments, the UE is configured to communicate with the base station.

In some embodiments, the processing circuitry of the host computer is configured to execute a host application, thereby providing the user data; and the UE comprises processing circuitry configured to execute a client application associated with the host application.

According to another aspect of the present disclosure, a method implemented in a communication system including a host computer, a base station, and a UE comprises: at the host computer, providing user data; and at the host computer, initiating a transmission carrying the user data to the UE via a cellular network comprising the base station, wherein the base station performs any of the steps of any of the base station methods disclosed herein.

In some embodiments, the method further comprises, at the base station, transmitting the user data.

In some embodiments, the user data is provided at the host computer by executing a host application, the method further comprising, at the UE, executing a client application associated with the host application.

According to another aspect of the present disclosure, a UE configured to communicate with a base station, the UE comprising a radio interface and processing circuitry configured to perform any of the UE methods disclosed herein.

According to another aspect of the present disclosure, a communication system including a host computer comprising processing circuitry configured to provide user data, and a communication interface configured to forward user data to a cellular network for transmission to a UE, wherein the UE comprises a radio interface and processing circuitry, the UE's components configured to perform any of the steps of any of the UE methods disclosed herein.

In some embodiments, the cellular network further includes a base station configured to communicate with the UE.

In some embodiments, the processing circuitry of the host computer is configured to execute a host application, thereby providing the user data, and the UE's processing circuitry is configured to execute a client application associated with the host application.

According to another aspect of the present disclosure, a method implemented in a communication system including a host computer, a base station, and a UE comprises: at the host computer, providing user data; and at the host computer, initiating a transmission carrying the user data to the UE via a cellular network comprising the base station, wherein the UE performs any of the steps of any of the UE methods disclosed herein.

In some embodiments, the method further comprises at the UE, receiving the user data from the base station.

According to another aspect of the present disclosure, a communication system including a host computer comprising a communication interface configured to receive user data originating from a transmission from a UE to a base station, wherein the UE comprises a radio interface and processing circuitry, the UE's processing circuitry configured to perform any of the steps of any of the UE methods disclosed herein.

In some embodiments, the communication system further includes the UE.

In some embodiments, the base station comprises a radio interface configured to communicate with the UE and a communication interface configured to forward to the host computer the user data carried by a transmission from the UE to the base station.

In some embodiments, the processing circuitry of the host computer is configured to execute a host application, and the UE's processing circuitry is configured to execute a client application associated with the host application, thereby providing the user data.

In some embodiments, the processing circuitry of the host computer is configured to execute a host application, thereby providing request data, and the UE's processing circuitry is configured to execute a client application associated with the host application, thereby providing the user data in response to the request data.

According to another aspect of the present disclosure, a method implemented in a communication system including a host computer, a base station, and a UE comprises, at the host computer, receiving user data transmitted to the base station from the UE, wherein the UE performs any of the steps of any of the UE methods disclosed herein.

In some embodiments, the method further comprises, at the UE, providing the user data to the base station.

In some embodiments, the method further comprises, at the UE, executing a client application, thereby providing the user data to be transmitted; and at the host computer, executing a host application associated with the client application.

In some embodiments, the user data to be transmitted is provided by the client application in response to the input data.

According to another aspect of the present disclosure, a communication system including a host computer comprising a communication interface configured to receive user data originating from a transmission from a UE to a base station, wherein the base station comprises a radio interface and processing circuitry, the base station's processing circuitry configured to perform any of the steps of any of the base station methods disclosed herein.

In some embodiments, the communication system further includes the base station.

In some embodiments, the UE is configured to communicate with the base station.

In some embodiments, the processing circuitry of the host computer is configured to execute a host application, and the UE is configured to execute a client application associated with the host application, thereby providing the user data to be received by the host computer.

According to another aspect of the present disclosure, a method implemented in a communication system including a host computer, a base station, and a UE comprises, at the host computer, receiving, from the base station, user data originating from a transmission which the base station has received from the UE, wherein the UE performs any of the steps of any of the UE methods disclosed herein.

In some embodiments, the method further comprises at the base station, receiving the user data from the UE.

In some embodiments, the method further comprises at the base station, initiating a transmission of the received user data to the host computer.

Certain embodiments may provide one or more of the following technical advantage(s). These advantages include having an assistive shared resource pool or SUL that can ensure K repetitions or transmission reliability; this approach can be better than multiple CGs as the latter may lead to high resource wastage than a shared resource allocation.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 21 is a flowchart illustrating a method implemented in a communication system, in accordance with some embodiments of the present disclosure;

FIG. 22 is a flowchart illustrating a method implemented in a communication system, in accordance with some embodiments of the present disclosure;

DETAILED DESCRIPTION

Figure 1:
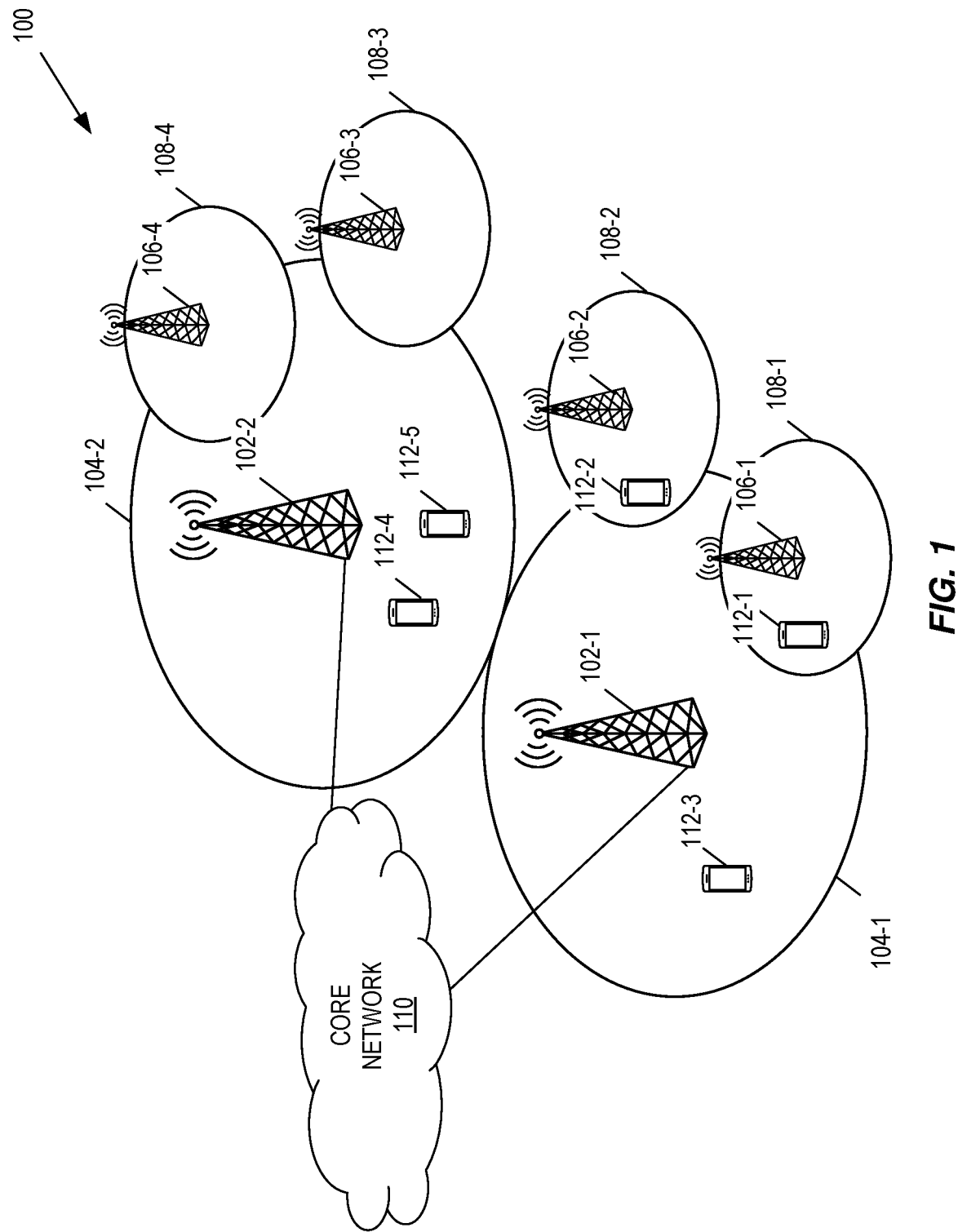
FIG. 1 illustrates one example of a cellular communications network according to some embodiments of the present disclosure.

Certain aspects of the present disclosure and their embodiments may provide solutions to the aforementioned or other challenges. In the present disclosure, enhancements to Grant-Free (GF) services with Configured Grant (CG) are presented.

According to one aspect, the present disclosure targets reliability enhancement for CG User Equipments (UEs) where a UE tries to ensure K repetitions by transmitting some or all repetitions in shared resource (pool) or Supplemental Uplink (SUL) carrier in a GF manner when the UE is unable to transmit in a sufficient number of CG Transmission Occasions (TOs). Transmissions in the shared pool or SUL can be performed randomly or with some semi-deterministic or fully deterministic pattern. The shared resource acts as an assistive resource to CG. Allocation of a shared resource alongside CG resources can ensure K repetitions or the equivalent: recognizing that the shared resources may have lower reliability than the CG resources, allocation of shared resources can support additional repetitions which could help to achieve at least the targeted reliability which could have otherwise been achieved with K repetitions alone in CG resources. Therefore, the total number of repetitions within the CG resources and the shared resources may be a number greater than K The CG period within the shared resource may be aligned with, or offset from, the CG period within the CG resources. Moreover, a UE transmitting with repetitions less than the K TOs in the CG can implement dynamic power control for such repetitions to achieve the target reliability.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
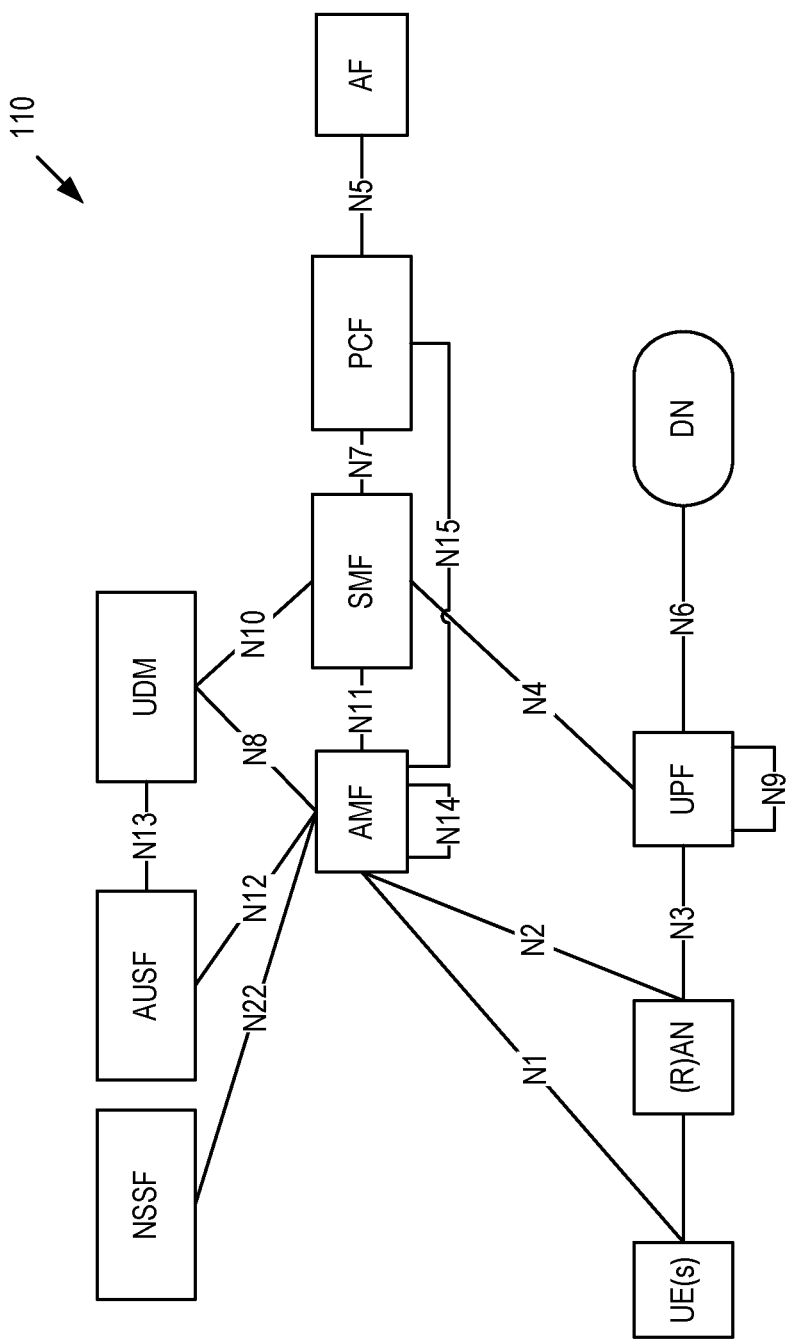
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs connected to either a Radio Access Network (RAN) or an Access Network (AN) as well as an Access and Mobility Management Function (AMF). Typically, the R(AN) comprises base stations, e.g., such as evolved Node Bs (eNBs) or NR base stations (gNBs) or similar. Seen from the core network side, the 5G core NFs shown in FIG. 2 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
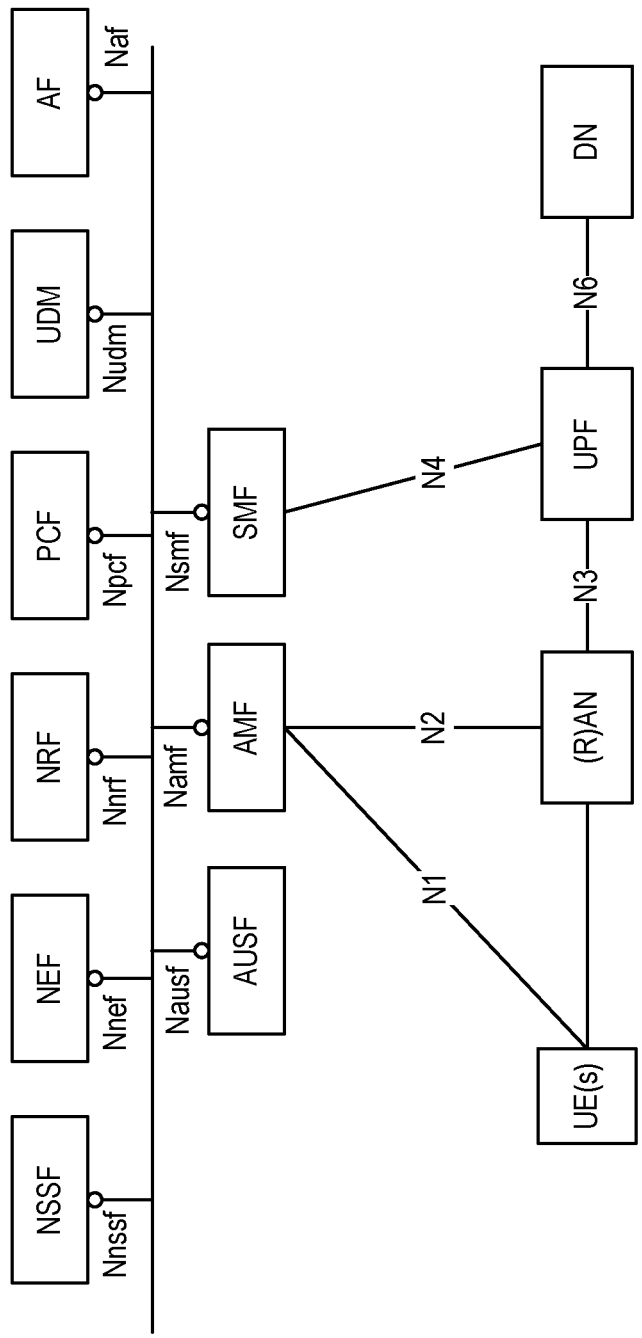
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Common Period Boundary for Shared Resource

A UE can use specific resources (e.g., periodical time-frequency resource) in a period of a CG to ensure its K repetition. However, if a UE misses its one or more transmission opportunities, e.g., because its traffic arrives late in the period, the UE then utilizes the remaining transmission opportunities. If the number of remaining TOs within CG resources is ≤K, the UE cannot ensure its K repetition transmission. To ensure K repetition transmission, some embodiments allocate a separate shared resource pool where a UE can transmit the rest of the repetitions which it may be unable to transmit within a period of CG. The shared resource can be, for example, a common Physical Uplink Shared Channel (PUSCH) resource. The data transmissions in the shared resource may be GF transmissions. Transmissions in the shared pool or SUL can be performed randomly or with some semi-deterministic or fully deterministic pattern.

Where the target is K transmissions in CG resource to achieve given reliability, if only X actual transmissions occurred (or could occur) in the CG resource (where X<A), then the number of transmissions needed to achieve K transmissions is Y, where Y=K−X Thus, at minimum, Y transmissions should occur in the shared resource. However, if the shared resource is less reliable than the CG resource, in some embodiments, the UE may transmit Y+N transmissions in the shared resource (where N≥1), so that even if some of the Y+N transmissions fail (e.g., due to collisions with transmissions from another UE also using the shared resource), there will still be Y transmissions that succeed, thus meeting the target total number of K transmissions.

Figure 4:
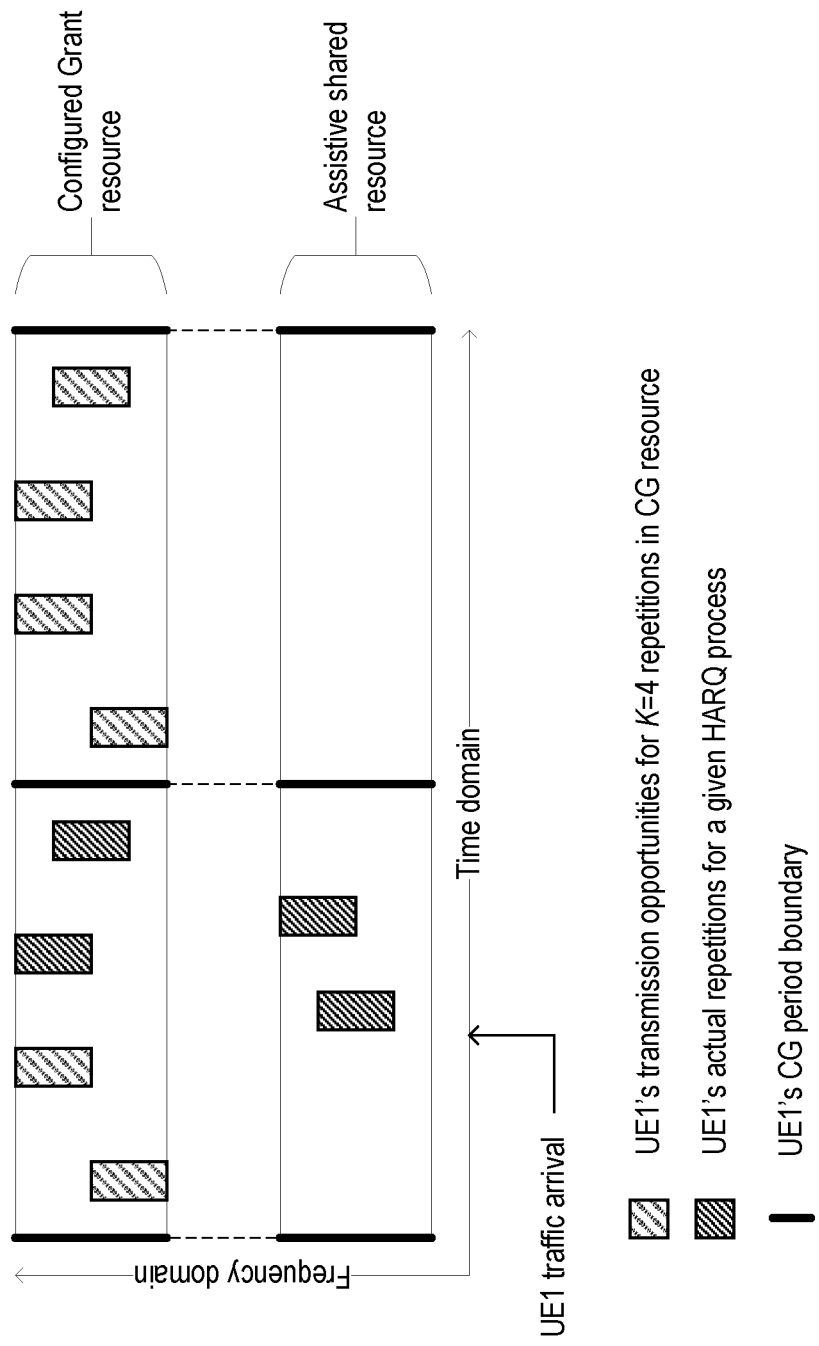
FIG. 4 illustrates the use of Transmission Opportunities (TOs) within a shared resource to provide additional TOs sufficient to ensure that K repetitions are performed, where the Configured Grant (CG) period boundary for the shared resource is aligned with the CG period boundary for the CG resource.

FIG. 4 illustrates the use of TOs within a shared resource to provide additional TOs sufficient to ensure that K repetitions are performed, according to some embodiments of the present disclosure in which the CG period boundary for the CG resource is aligned with the CG period boundary for the shared resource. In the embodiment illustrated in FIG. 4, the UE can utilize any resource (e.g., in case of random access) from a predefined resource pool or UE-specific transmission pattern within the shared resource pool. In these embodiments, both the CG resources and the shared resource pool have the same CG period boundaries in the time domain because repetitions belonging to a Hybrid Automatic Repeat Request (HARQ) process are transmitted within a period that is used by both the CG resources and the shared resource pool.

Figure 5:
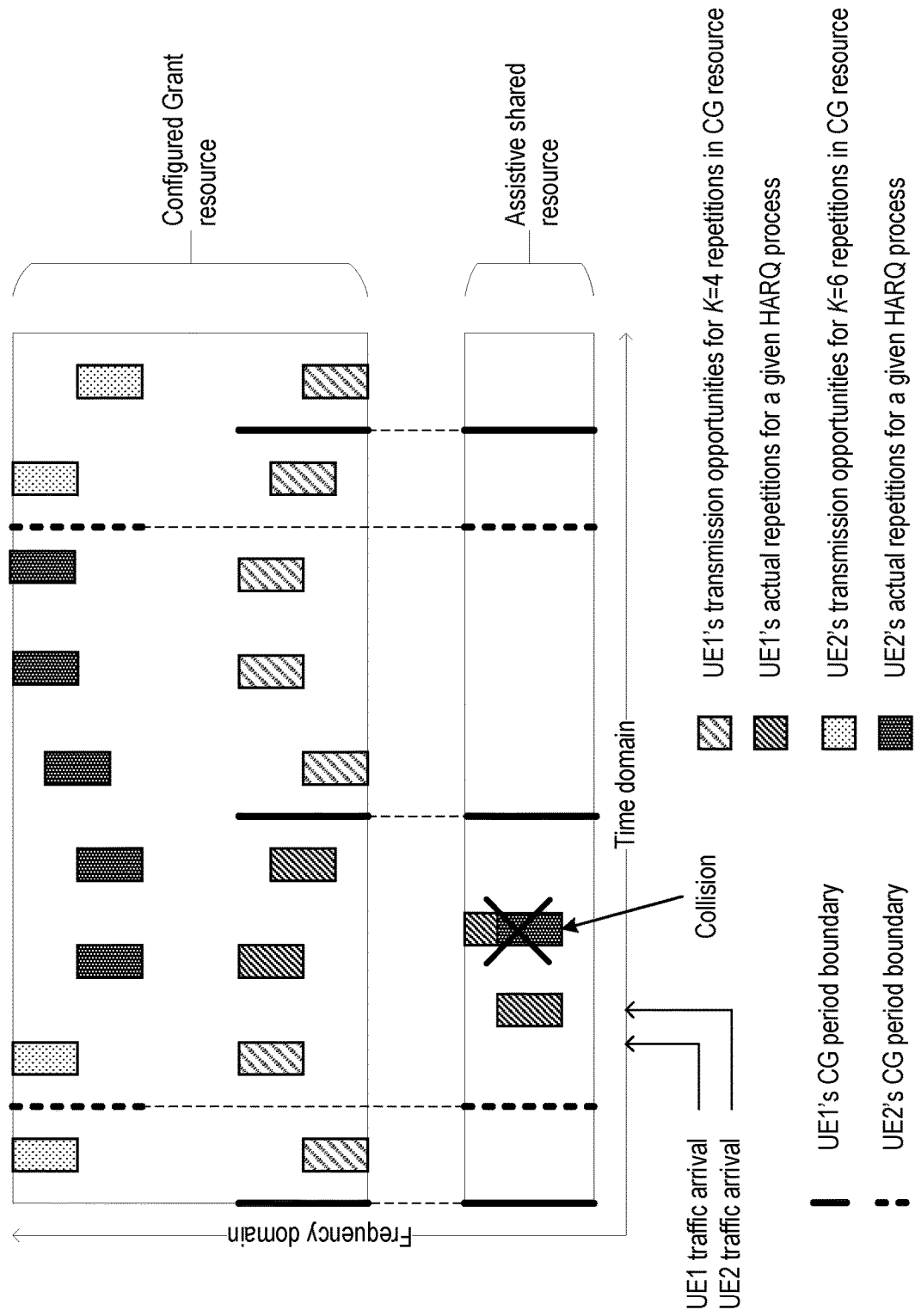
FIG. 5 illustrates a scenario where a repetition for one User Equipment (UE) collides with a repetition for another UE in the shared resource.

FIG. 5 illustrates a scenario where two UEs, called UE1 and UE2, attempt to put repetitions into the shared resource and in which one of the repetitions for UE1 collides with one of the repetitions for UE2 in the shared resource. FIG. 5 illustrates the point that transmissions in the shared resource are more likely to suffer collisions than those in the CG resources and are therefore less reliable than transmissions in the CG resources.

FIGS. 4 and 5 illustrate embodiments where the TOs in the CG resources and the shared resource pool (and therefore the actual repetitions also) are not contiguous, e.g., there is a gap of time between them. The repetitions may include a time-gap between the TOs.

Figure 6:
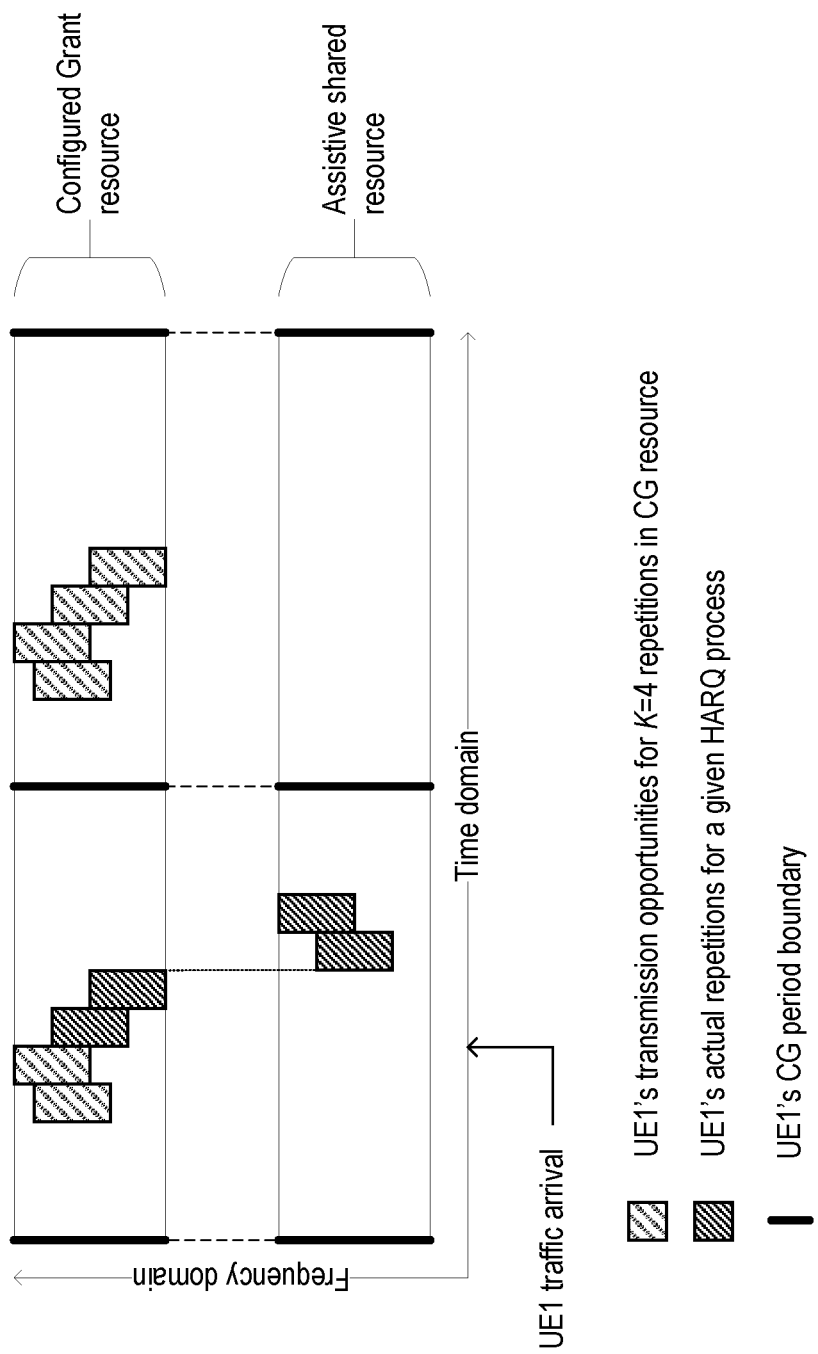
FIG. 6 illustrates an embodiment in which the TOs are contiguous in the time domain.

FIG. 6 illustrates an embodiment in which the TOs are contiguous in the time domain. In the embodiment illustrated in FIG. 6, the TOs are not only contiguous in the CG resources and contiguous in the shared resources, but the combined TOs are contiguous in the time domain.

Period Boundary with an Offset for Shared Resource

In the second embodiment of the present disclosure, the CG period boundary within the shared resource is not aligned with the CG period boundary of the CG resource, but instead offset from the CG period boundary of the CG resource. This is illustrated in FIG. 7.

Figure 7:
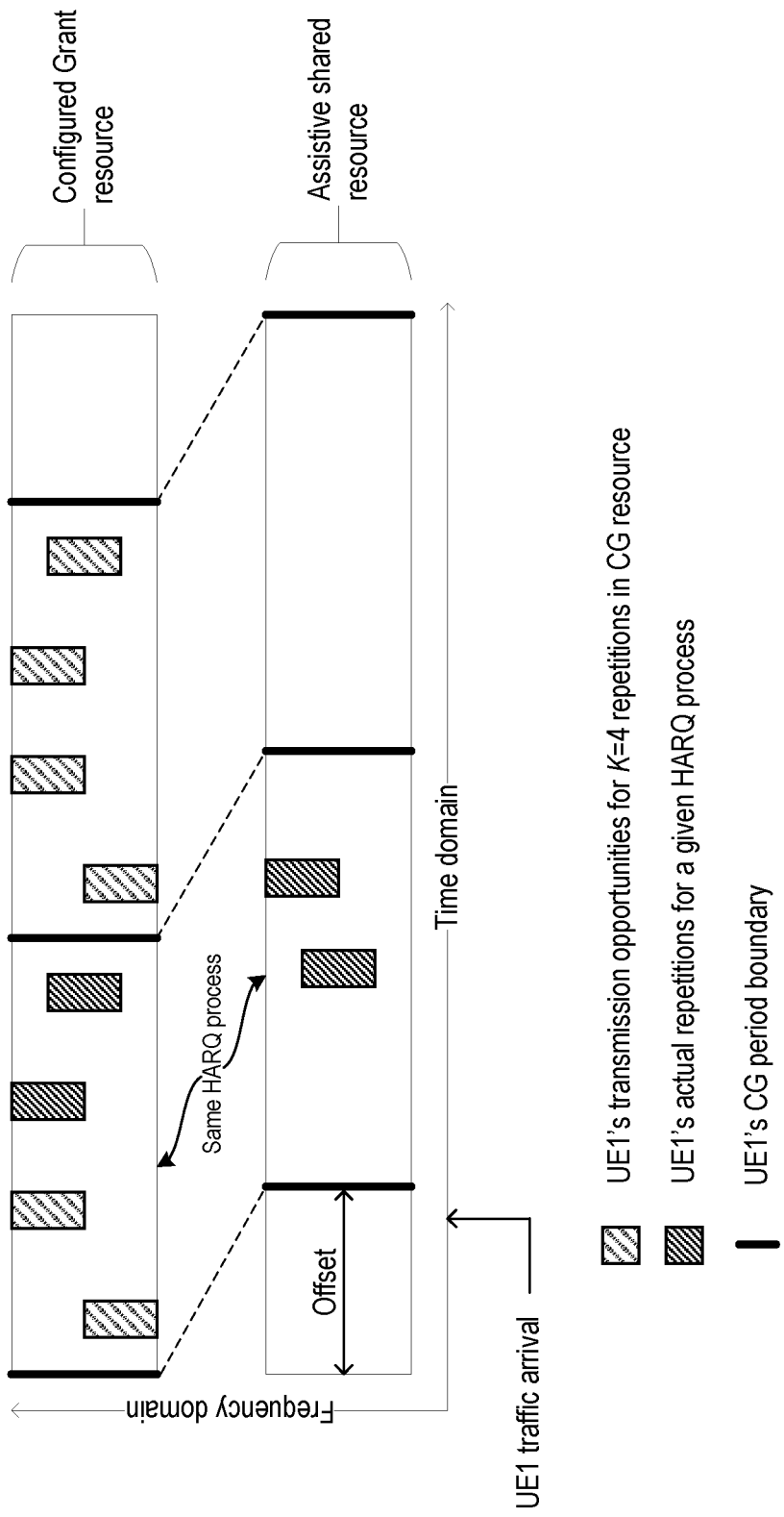
FIG. 7 illustrates an embodiment in which the CG period boundary for the shared resource is offset from the CG period boundary for the CG resource.

FIG. 7 illustrates the use of TOs within a shared resource to provide additional TOs sufficient to ensure that K repetitions are performed, according to some embodiments of the present disclosure in which the CG period boundary for the CG resource is aligned with the CG period boundary for the shared resource.

In the embodiment illustrated in FIG. 7, the shared resource's periodical boundary is set at a given offset with respect to the boundary of a CG's period. This provides the advantage that a UE can schedule the additional actual repetitions in the shared resource later in time (compared to the actual repetitions in the CG resource) yet still remain within the same CG boundary and thus within the same HARQ process. Since the transmission on the shared resources occupies the same HARQ process, it can use the same signature that was used for the actual repetitions in the CG resources. This benefit is illustrated more clearly in FIG. 8.

Figure 8:
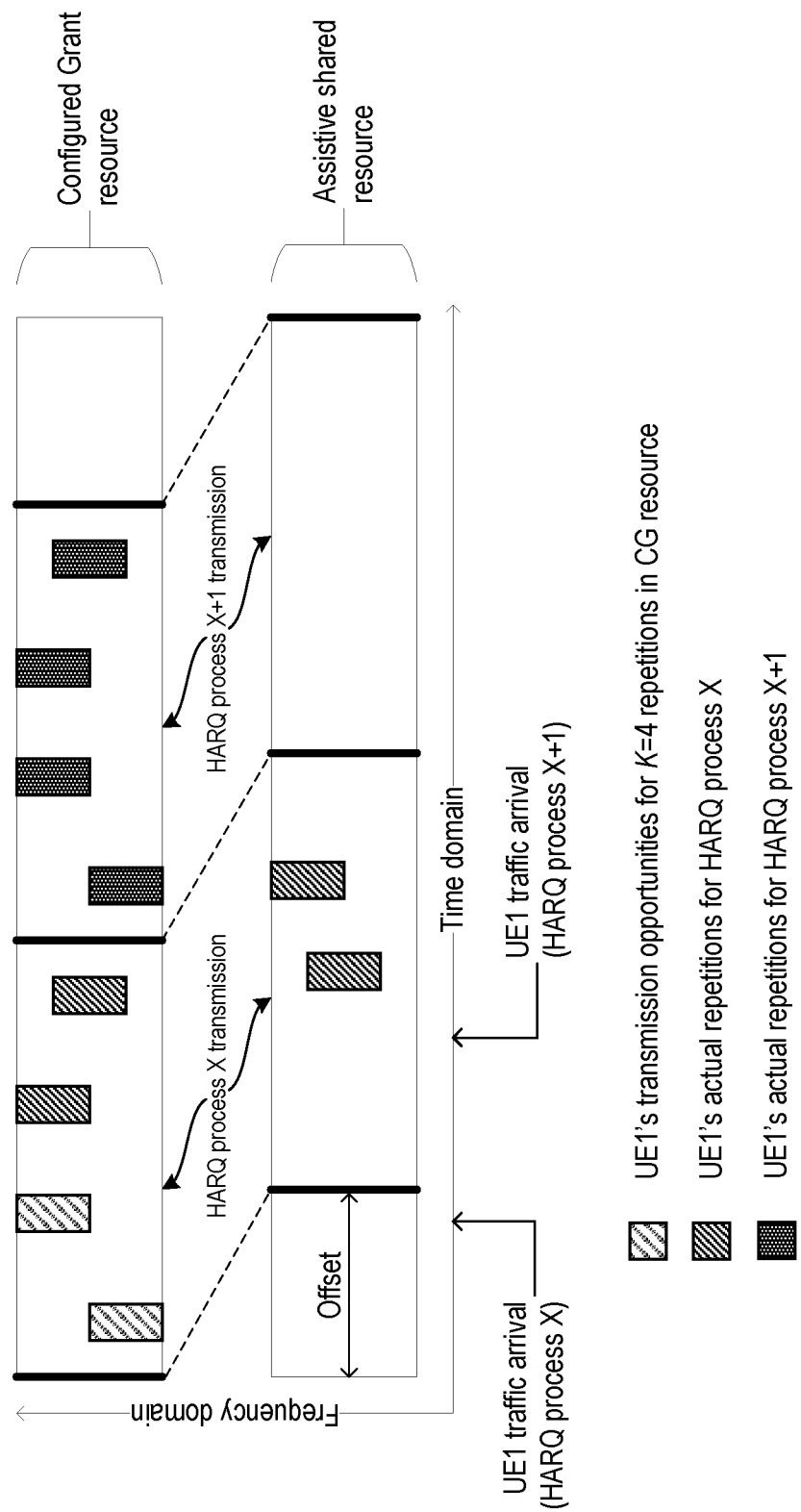
FIG. 8 illustrates another embodiment in which the CG period boundary for the shared resource is offset from the CG period boundary for the CG resource.

FIG. 8 illustrates the use of TOs within a shared resource to provide additional TOs sufficient to ensure that K repetitions are performed, according to some embodiments of the present disclosure in which the CG period boundary for the CG resource is aligned with the CG period boundary for the shared resource. FIG. 8 illustrates the point that, because the CG period boundary for the shared resource is offset relative to the CG period boundary of the CG resource, all of the repetitions desired for the first HARQ process, "HARQ process X," can be transmitted in the shared resource without interfering with the repetitions for the next HARQ process, "HARQ process X+1," and without requiring an additional signature. The offset gives the UE some more time to fulfill the repetitions for one HARQ process before the CG period for that HARQ has expired.

In some embodiments, the offset value can be sent using Downlink Control Information (DCI) or Radio Resource Control (RRC) messages.

Figure 9:
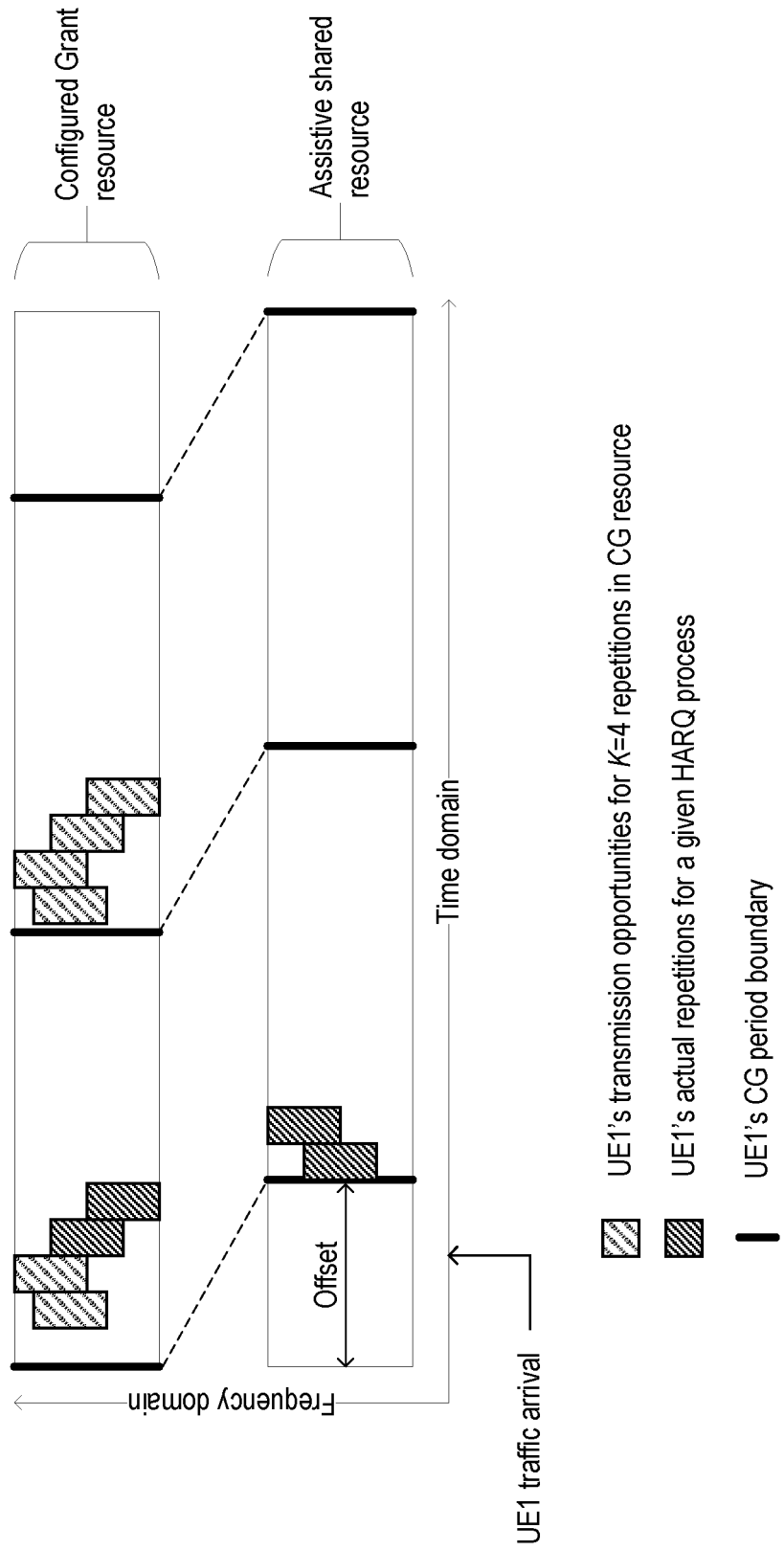
FIG. 9 illustrates an embodiment in which the CG period for the shared resource is offset relative to the CG period in the CG resource and where the TOs are contiguous in the time domain and where.

FIG. 9 illustrates an embodiment in which the TOs are contiguous in the time domain and where the CG period for the shared resource is offset relative to the CG period in the CG resource.

Rel-15 Compatibility

In Release 15 (Rel-15) of the 3GPP specifications, only one TO (or mini-slot) per slot is allowed for a repetition. Therefore, for K TOs, K slots are required. This is illustrated in FIG. 10.

Figure 10:
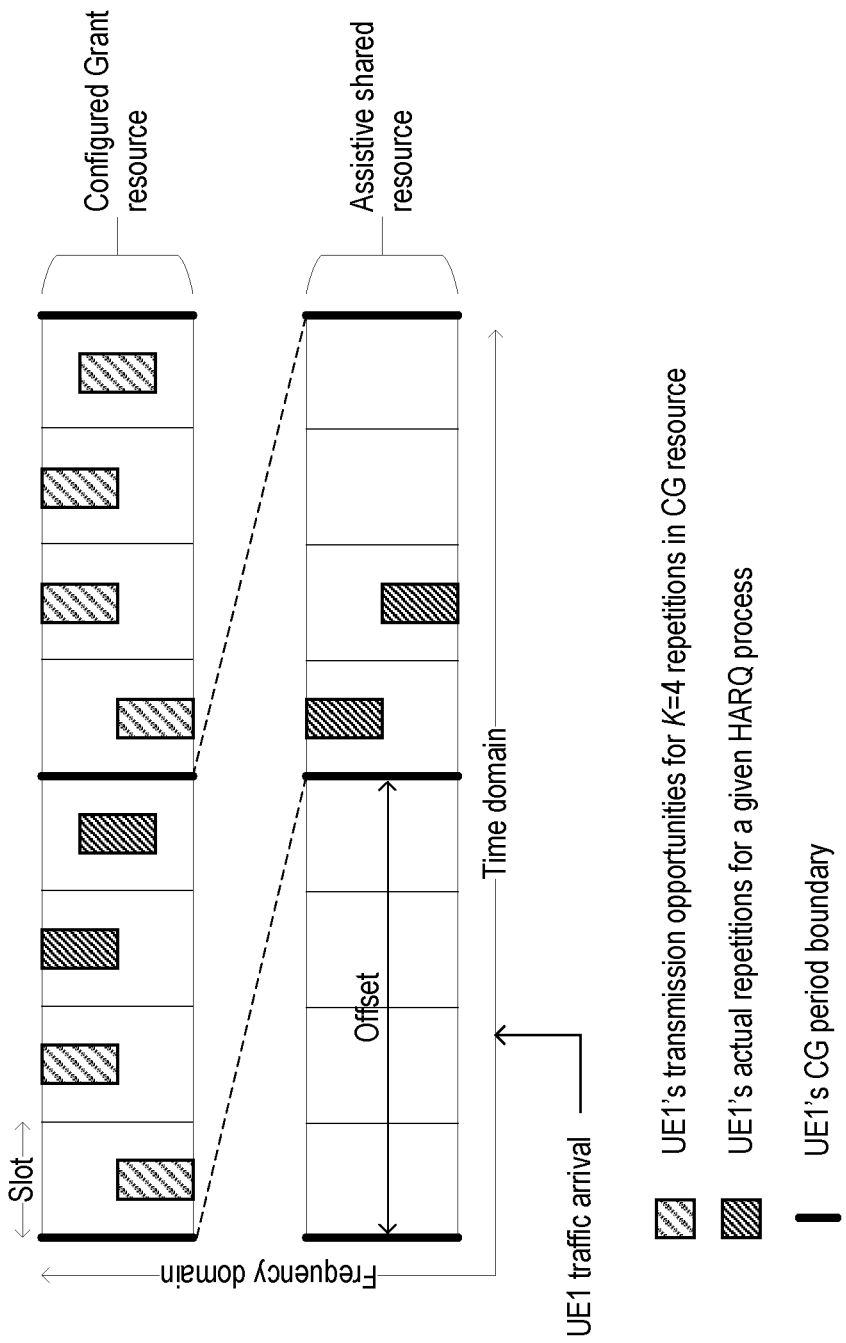
FIG. 10 illustrates an embodiment in which only one TO or mini-slot for a repetition is allowed per slot and thus the CG period boundary for the shared resource is aligned with the next CG period boundary for the CG resource.

FIG. 10 illustrates the use of TOs within a shared resource to provide additional TOs sufficient to ensure that K repetitions are performed, according to some embodiments of the present disclosure in which only one TO or mini-slot for a repetition is allowed per slot. In such scenarios, the UE cannot put a repetition for the same HARQ into both the CG resources and the shared resources during the same time slot. Since there is no opportunity to put more than one repetition for the same HARQ into any slot, an offset equivalent to ≥K slots would be helpful to transmit the rest of the repetitions in the shared resource.

However, the limitation of "one repetition per time slot" may apply only to a particular HARQ process, in which case a UE is allowed to transmit a TO for a first HARQ process within the shared resources and a TO for a second HARQ within the CG resources, within the same time slot. This is illustrated in FIG. 11.

Figure 11:
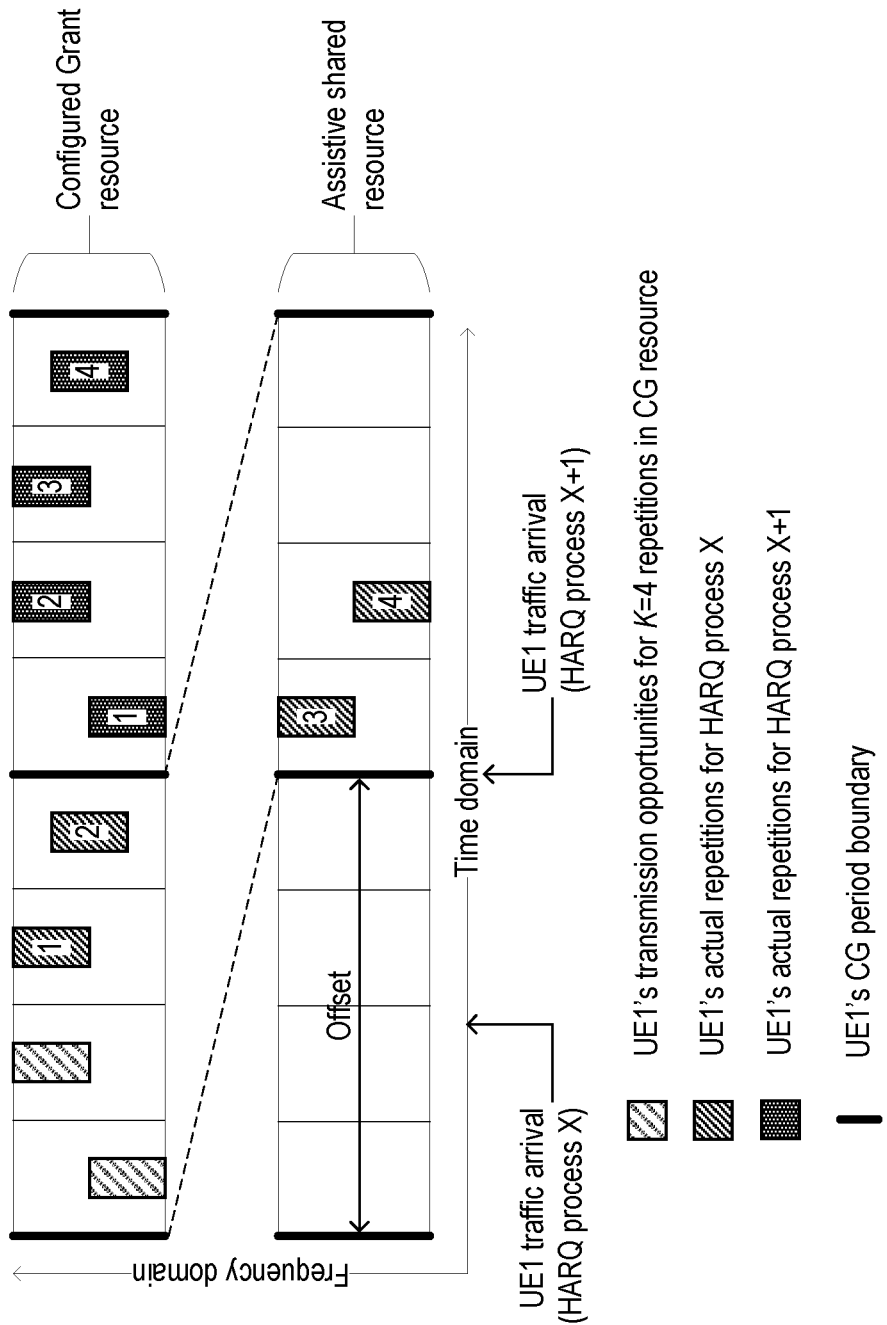
FIG. 11 illustrates another embodiment in which only one TO or mini-slot for a repetition is allowed per slot and thus the CG period boundary for the shared resource is aligned with the next CG period boundary for the CG resource.

FIG. 11 illustrates the use of TOs within a shared resource to provide additional TOs sufficient to ensure that K repetitions are performed, according to some embodiments of the present disclosure in which only one TO or mini-slot for a repetition is allowed per slot per HARQ process.

Detection in the Shared Resource

If there are M UEs (with M CG settings) which can have a common shared resource for the transmission of rest of the repetitions, then the gNB may be required to monitor these M UEs constantly in the shared resource. For example, the gNB may need to perform blind decoding of at least a portion of the shared resources. To reduce this burden, following techniques may be used. The UE will check the shared resource if the UE detects the transmission or senses the energy in the CG, and, in some embodiments, try to identify only those UEs in the shared resource if their repetitions are done partially in the CG. Further, the gNB may ensure that majority of the repetitions should occur in the CG as the CG resource is more reliable than shared resource; FIG. 5, for example, shows that there may be collisions within the shared resource. For example, if the traffic arrives close to end of the period, UE should rather start transmitting in the next period (if latency is not impacted) instead of transmitting in the current period with rest of the repetitions in the shared resource.

Dynamic SUL Selection

For a UE configured with a SUL carrier in addition to a non-SUL carrier, CG-based PUSCH transmission can be enhanced such that for a PUSCH originally scheduled on a non-SUL carrier, the UE switches to PUSCH transmission on the SUL carrier when the actual number of repetitions K' is lower than a threshold, $K' <= K_{threshold}$. For example, $K_{threshold} = \text{ceil}(K/2)$.

Specifically, the activation DCI has the "Uplink (UL)/SUL indicator" field of value '0,' which indicates the non-supplementary uplink. When the data arrival allows more than $K_{threshold}$ repetitions of the PUSCH, the PUSCH stays on the non-SUL carrier. When the data arrival does not allow more than $K_{threshold}$ repetitions of the PUSCH, then the UE switches the PUSCH transmission to the SUL carrier on its own (i.e., without a signal from the gNB). Since the SUL carrier tends to have lower carrier frequency and allow more reliable UL transmission, switching to the SUL carrier improves PUSCH reliability.

When this enhancement is used, this requires a corresponding change in gNB reception. Specifically, when the gNB monitors PUSCH transmission on UL CG for a UE with SUL configured, then:

For transmission occasions starting at position 0, 1, . . . , $(K-K_{threshold}-1)$, the corresponding number of actual transmissions are: K, (K−1), . . . , $(K_{threshold}+1)$. Thus, the gNB performs detection of PUSCH on non-SUL carrier;

For transmission occasions starting at position $(K-K_{threshold})$, $(K-K_{threshold}+1)$, . . . , (K−1), the corresponding number of actual transmissions are: $K_{threshold}$, $K_{threshold}-1$, . . . , 1. Thus the gNB performs detection of PUSCH on SUL carrier;

In these embodiments, the SUL carrier can be a common SUL carrier shared by multiple UEs. In this case, the SUL carrier can be viewed as a shared assistive resource.

Power Control Based

Currently the PUSCH power control is defined as follows [Section 7.1.1, 3GPP Technical Specification (TS) 38.213, Version 15.4.0]: If a UE transmits a PUSCH on active UL Bandwidth Part (BWP) b of carrier f of serving cell c using parameter set configuration with index j and PUSCH power control adjustment state with index l, the UE determines the PUSCH transmission power (in dBm) $P_{PUSCH,b,f,c}(i, j, q_d, l)$ in PUSCH transmission occasion i as $$P_{PUSCH,b,f,c}(i, j, q_d, l) = \min \left\{ \begin{array}{l} P_{CMAX,f,c}(i), \\ P_{O\_PUSCH,b,f,c}(j) + 10 \log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

Component $\Delta_{TF,b,f,c}(i)=10\ \log_{10}((2^{BPRE \cdot K}-1)\cdot\beta_{offset}^{PUSCH})$ accounts for the Modulation and Coding Scheme (MCS) via parameter $$BPRE = \sum_{r=0}^{C-1} K_r/N_{RE}$$

for PUSCH with UL Shared Channel (UL-SCH) data.

When PUSCH on UL configured grant can only transmit K' repetitions instead of K repetitions, K'<K, the power control formula can take this into account, and increase the PUSCH transmit power accordingly. That is, the UE uses Bits Per Resource Element (BPRE) BPRE' instead of BPRE in the PUSCH power control formula, where BPRE' is defined as follows:

$$BPRE' = \frac{K}{K'} BPRE = \frac{K}{K'} \sum_{r=0}^{C-1} K_r/N_{RE}$$

Since the actual number of repetitions K' depends on the UL data arrival time relative to the UL CG periodicity, the actual power used also varies accordingly.

The power control based method has the benefit of no impact to gNB reception of PUSCH. The potential deficiency is that a UE may not be able to increase its transmit power, e.g., when the UE is already operating at maximum power allowed for the PUSCH.

Example Implementations

Figure 12:
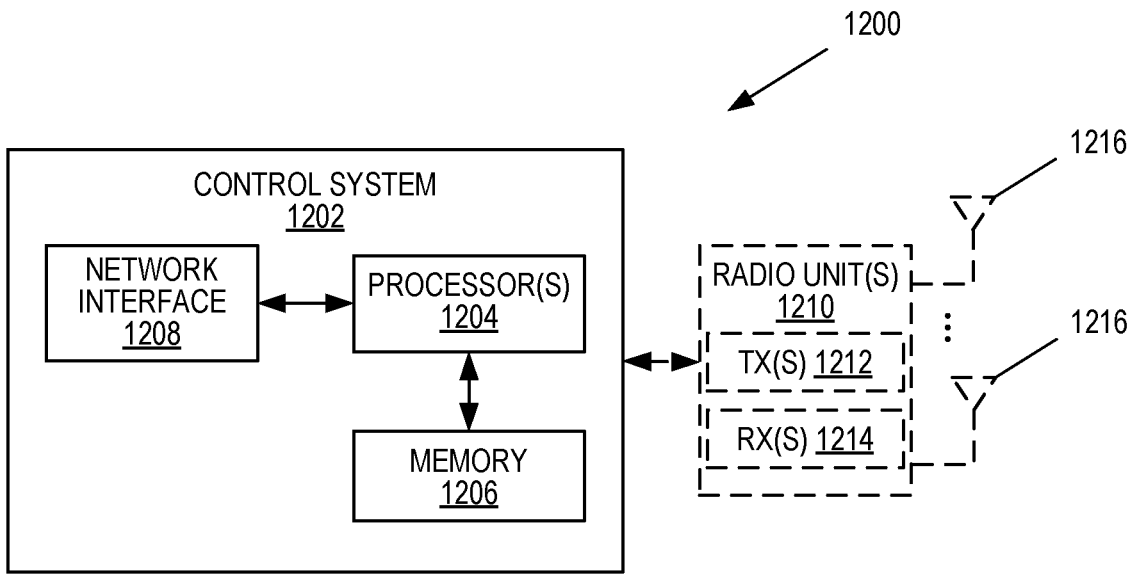
FIG. 12 is a schematic block diagram of a network node according to some embodiments of the present disclosure.

FIG. 12 is a schematic block diagram of a network node 1200 according to some embodiments of the present disclosure. The network node 1200 may be, for example, a radio access node, such as a base station 102 or 106. As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the network node 1200 may include one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a network node 1200 as described herein. In some embodiments, the function(s) are implemented in software that is stored, e.g., in the memory 1206 and executed by the one or more processors 1204.

Figure 13:
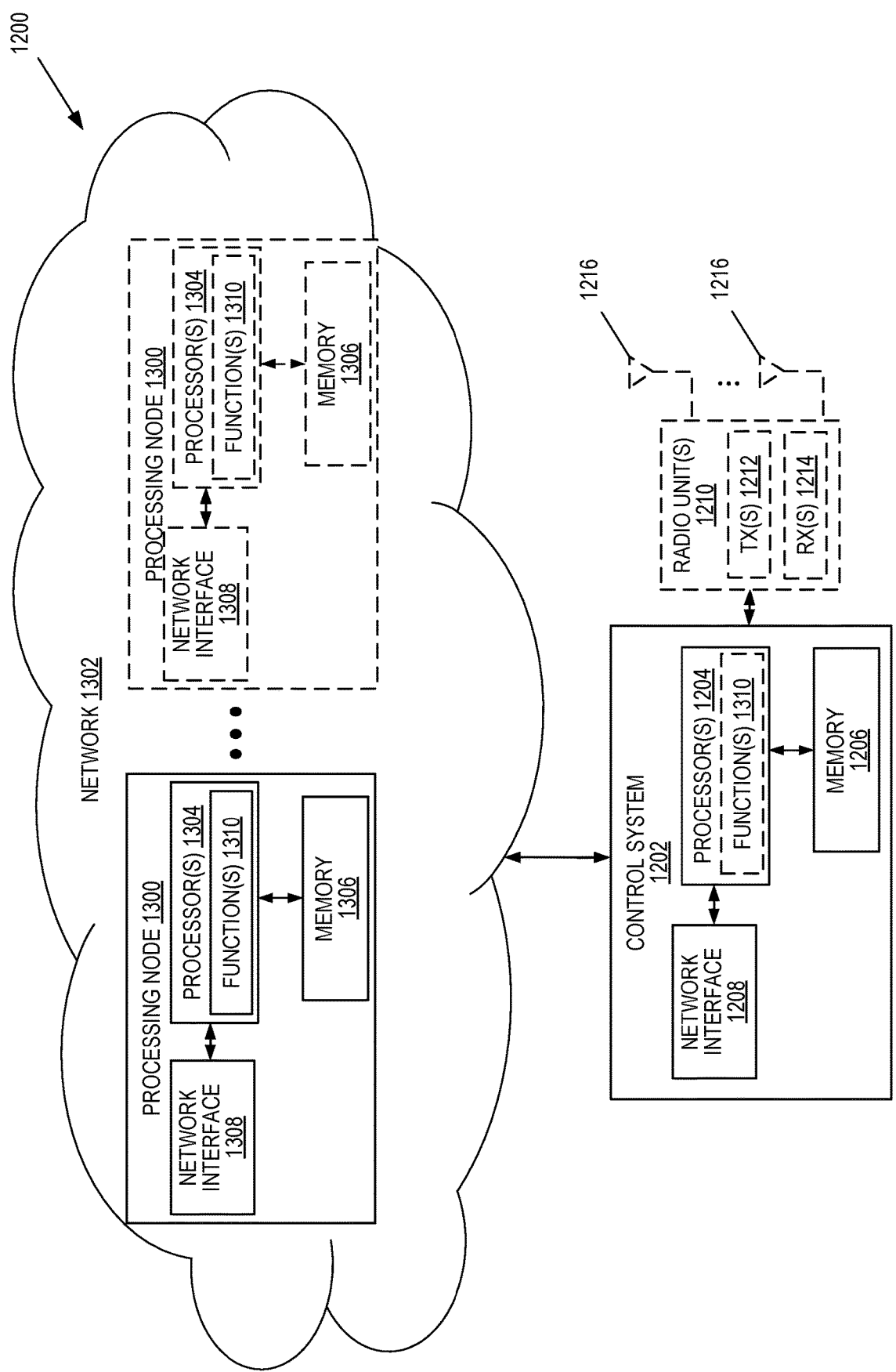
FIG. 13 is a schematic block diagram that illustrates a virtualized embodiment of the network node according to some embodiments of the present disclosure.

FIG. 13 is a schematic block diagram that illustrates a virtualized embodiment of the network node 1200 according to some embodiments of the present disclosure. This discussion is equally applicable to other types of network nodes. Further, other types of network nodes may have similar virtualized architectures.

As used herein, a "virtualized" network node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the network node 1200 described herein are implemented at the one or more processing nodes 1300 or distributed across the control system 1202 and the one or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of the network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
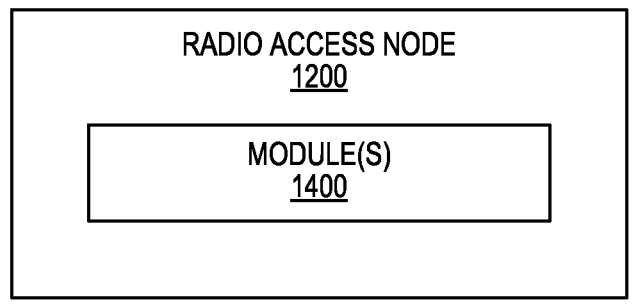
FIG. 14 is a schematic block diagram of the network node according to some other embodiments of the present disclosure.

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
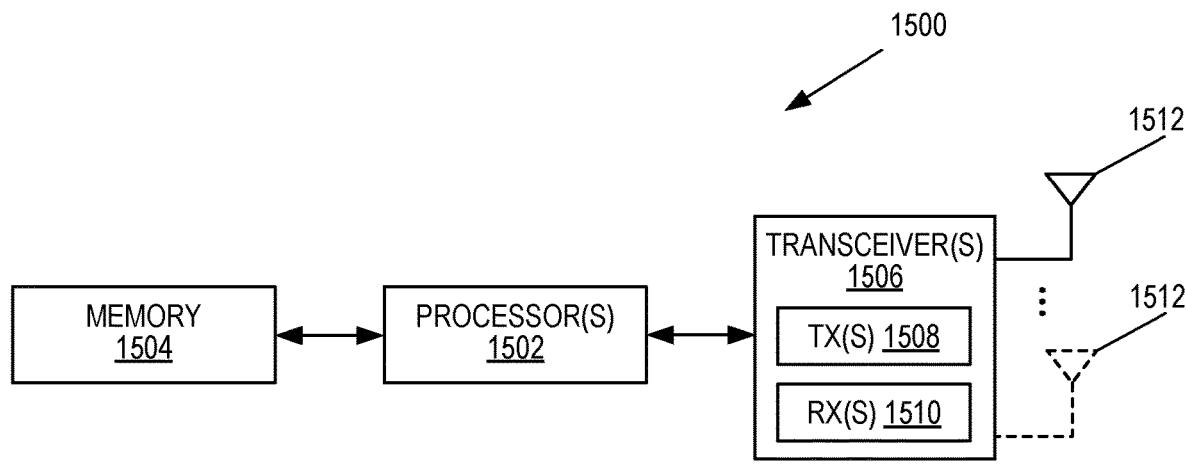
FIG. 15 is a schematic block diagram of a UE according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s)

1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
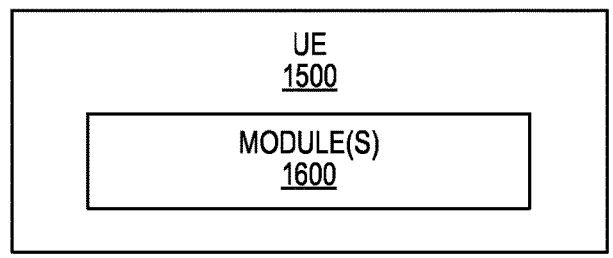
FIG. 16 is a schematic block diagram of the UE according to some other embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
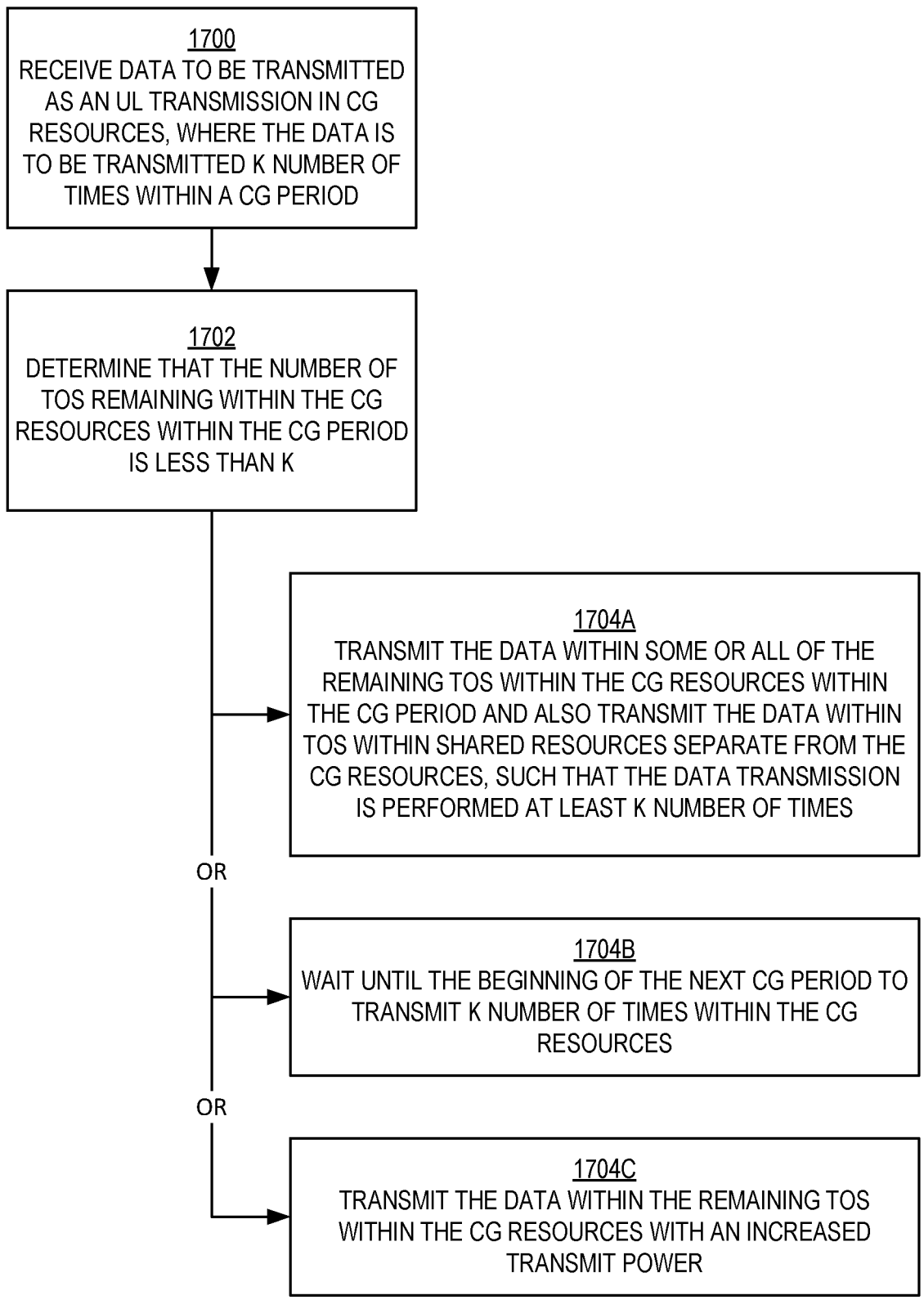
FIG. 17 is a flowchart illustrating a method performed by a UE operating in a 5G network according to some embodiments of the present disclosure.

FIG. 17 is a flowchart illustrating a method performed by a UE operating in a 5G network according to some embodiments of the present disclosure. In the embodiment illustrated in FIG. 17, the method includes the following steps:

In step 1700, a UE receives data to be transmitted as an UL transmission in CG resources, where the data is to be transmitted K number of times within the CG period. For example, the UE's transceiver receives the data from a higher layer (e.g., from an application layer entity) within the UE itself. Data transmitted in CG resources is usually GF, but the present subject matter is not limited to only GF transmissions. The same data content is being transmitted multiple times, but the specific form or representation of that data might or might not vary. For example, the form of the data being transmitted multiple times may vary (e.g., different encoding) due to redundancy level considerations. Alternatively, the form of the data may be exactly the same for each of the multiple transmissions.

In step 1702, the UE determines that the number of TOs remaining within the CG resources within the CG period for the UE is less than K For example, the UE may not receive the data to be UL transmitted until well within a current CG period; since the UE knows the location of the TOs within CG periods, the UE can determine based on the arrival time of the data how many TOs within the current CG period have already passed and which the UE therefore cannot use. In another scenario, one of the TOs that the UE intended to use for first data to be UL transmitted may be preempted, e.g., by second data that has higher priority; the UE can determine that there are not enough remaining TOs to meet the required K number of transmissions for the first data. In Time Division Duplexing (TDD) systems, a UE may be unable to use all TOs for an UL transmission because some of them occur during a Downlink (DL) TDD portion. These examples are illustrative and not limiting.

In steps 1704A-C, the UE takes action to mitigate the insufficiency of remaining TOs necessary to meet the required K number of transmissions. In one embodiment, the UE transmits the data using some or all of the remaining TOs within the CG resources and also transmits the data using TOs within shared resources, which are different from the CG resources, such that the transmission is repeated performed K number of times (step 1704A). In another embodiment, the UE waits until the beginning of the next CG period to transmit K number of times using the CG resources (step 1704B). In yet another embodiment, the UE transmits the data using the remaining TOs within the CG resources, but with increased transmit power in order to increase the likelihood of a successful reception by the gNB or other intended recipient (step 1704C). The techniques above may also be combined, e.g., the UE may transmit using CG resources and also using shared resources, with transmissions in either or both at increased transmit power.

Figure 18:
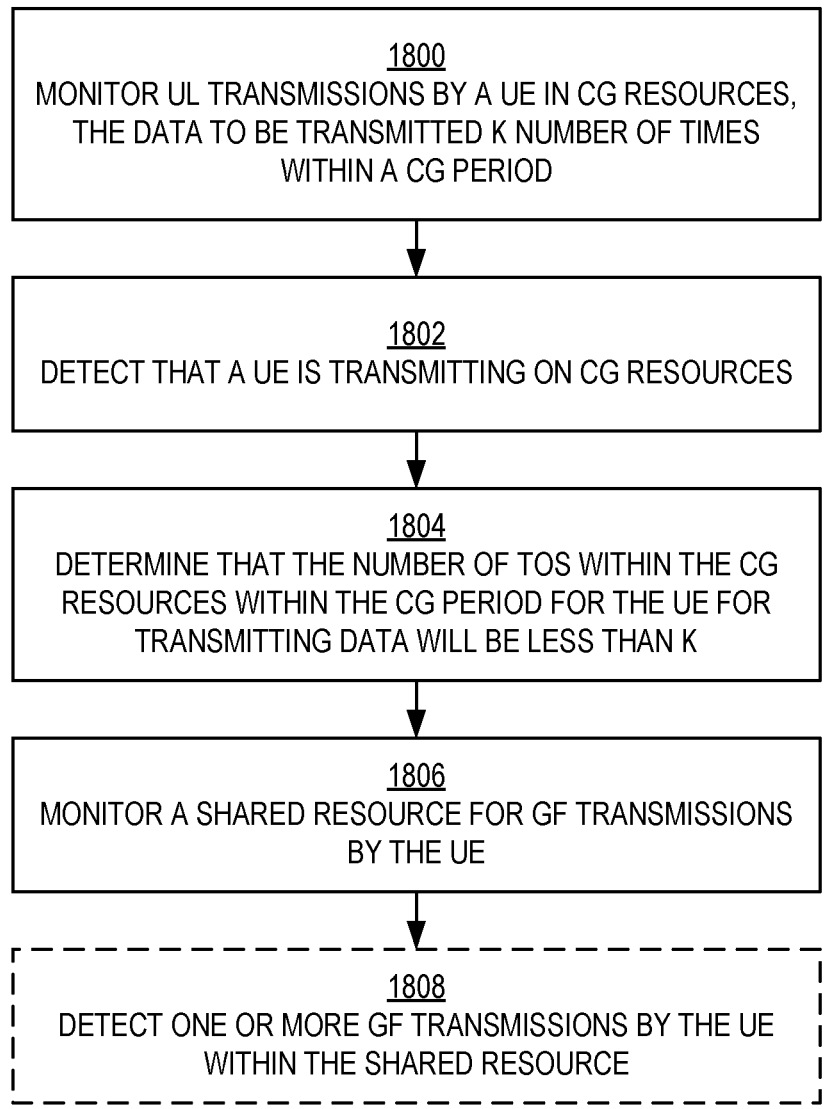
FIG. 18 is a flowchart illustrating a method performed by a New Radio (NR) base station according to some embodiments of the present disclosure.

FIG. 18 is a flowchart illustrating a method performed by a NR base station, or gNB, according to some embodiments of the present disclosure. In the embodiment illustrated in FIG. 18, the method includes the following steps:

In step 1800, the gNB monitors UL transmissions by a UE in CG resources, the data to be transmitted K number of times within a CG period.

In step 1802, the gNB detects that the UE is transmitting on CG resources.

In step 1804, the gNB determines that the number of TOs remaining within the CG resources and within a CG period for the UE is less than K.

In step 1806, the gNB monitors a shared resource for transmissions by the UE. For example, the shared resources may be blind decoded. The transmissions in the shared resource may be GF transmissions.

In step 1808, the gNB may detect one or more transmissions by the UE within the shared resource, e.g., for embodiments where the UE enlists the use of shared resources in order to ensure that the total number of transmissions within the CG resources and the shared resources will be the target number K. In embodiments where the UE does not use shared resources but instead increases the transmit power of the remaining transmissions within the CG resources within the CG period, the gNB will not detect any transmissions by the UE within the shared resource.

Figure 19:
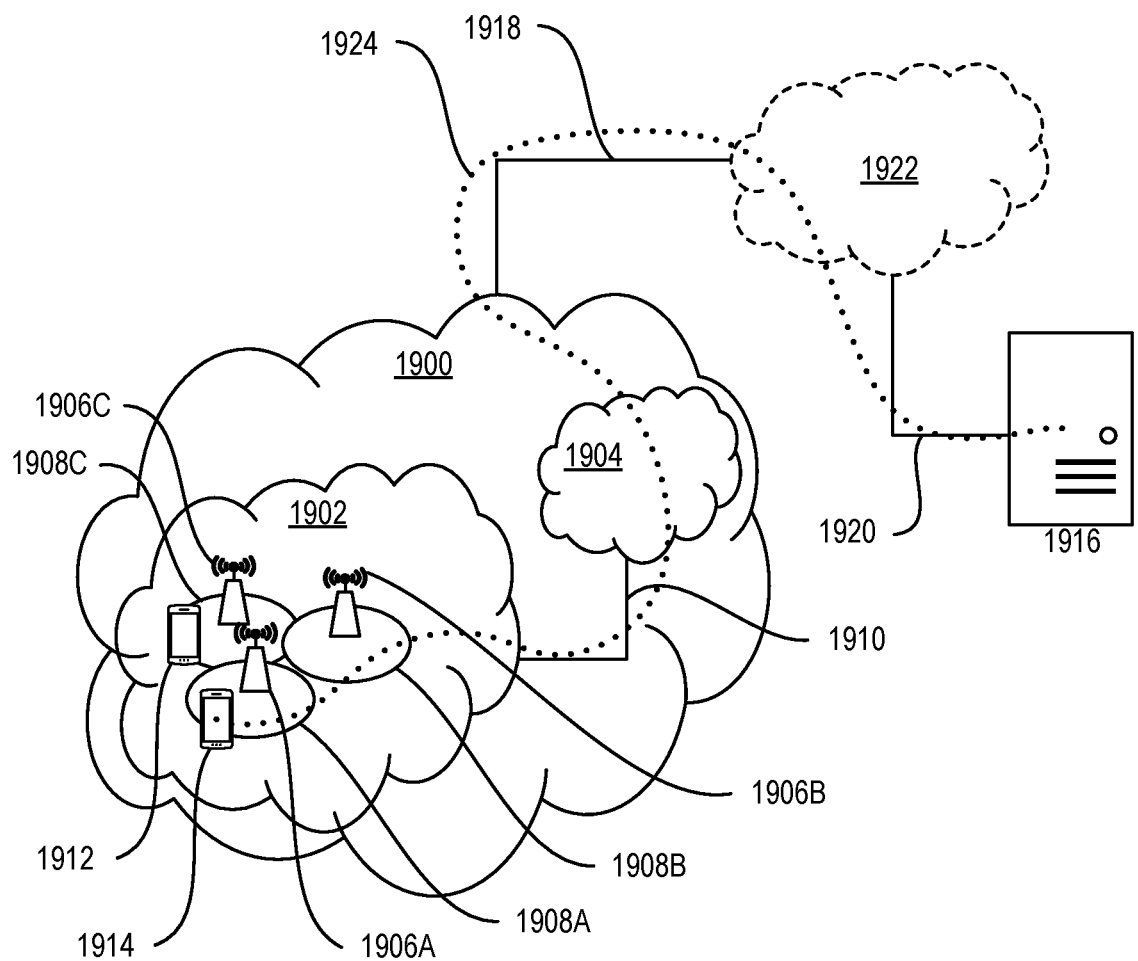
FIG. 19 illustrates a communication system according to some embodiments of the present disclosure.

FIG. 19 illustrates a communication system according to some embodiments of the present disclosure. In the embodiment illustrated in FIG. 19, a communication system includes a telecommunication network 1900, such as a 3GPP-type cellular network, which comprises an access network 1902, such as a RAN, and a core network 1904. The access network 1902 comprises a plurality of base stations 1906A, 1906B, 1906C, such as NBs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Figure 20:
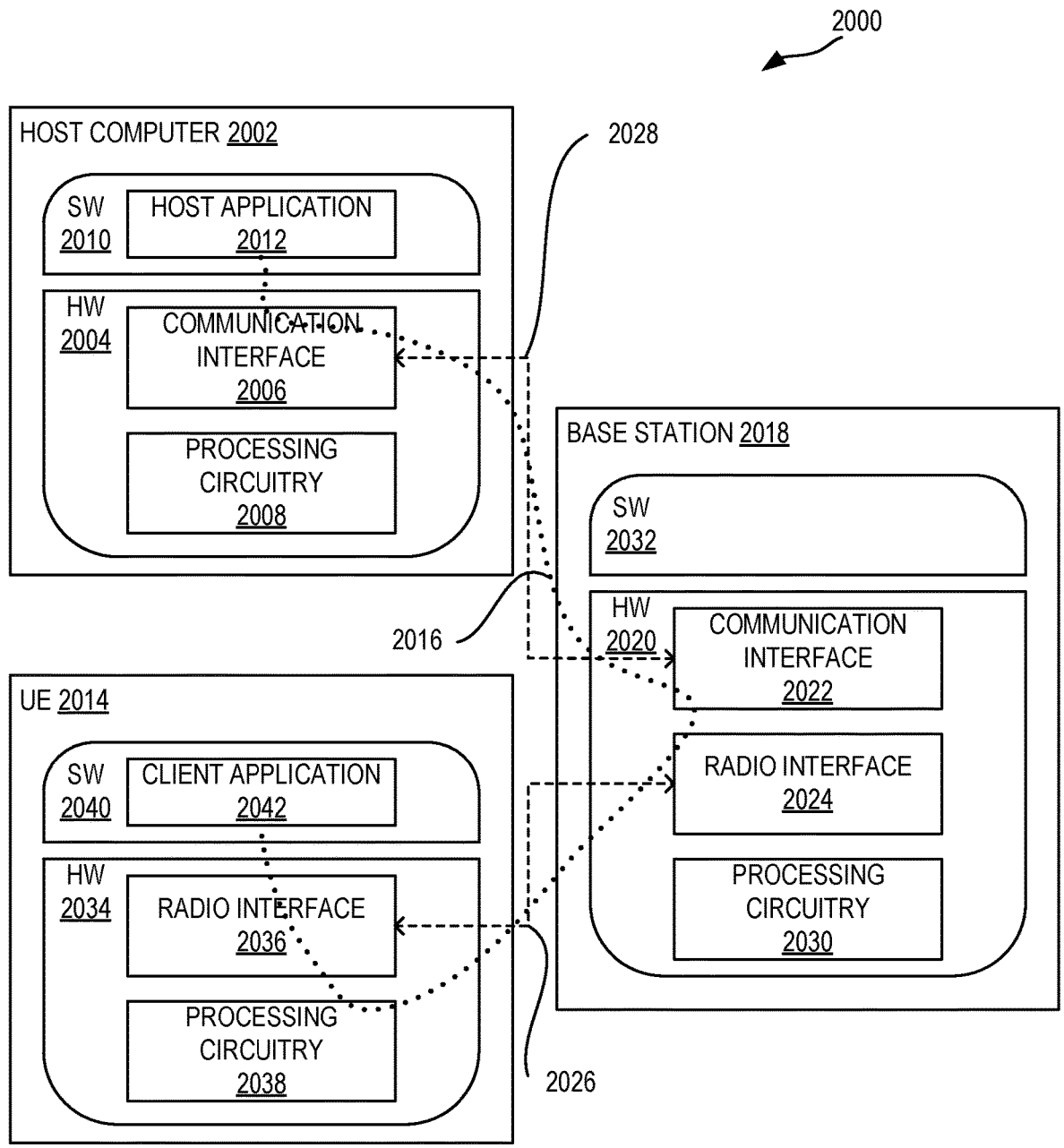
FIG. 20 illustrates a communication system according to some embodiments of the present disclosure.

FIG. 20 illustrates a communication system according to some embodiments of the present disclosure. Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments provide additional opportunities for transmission repetitions and thereby provide benefits such as increased reliability for URLLC transmissions.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2018, and it may be unknown or imperceptible to the base station 2018. Such procedures and functionalities may be known and practiced in the art. In certain embodiments, measurements may involve proprietary UE signaling facilitating the host computer 2002's measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

FIG. 21 is a flowchart illustrating a method implemented in a communication system, in accordance with some embodiments of the present disclosure. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with some embodiments of the present disclosure. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

Figures 23, 24:
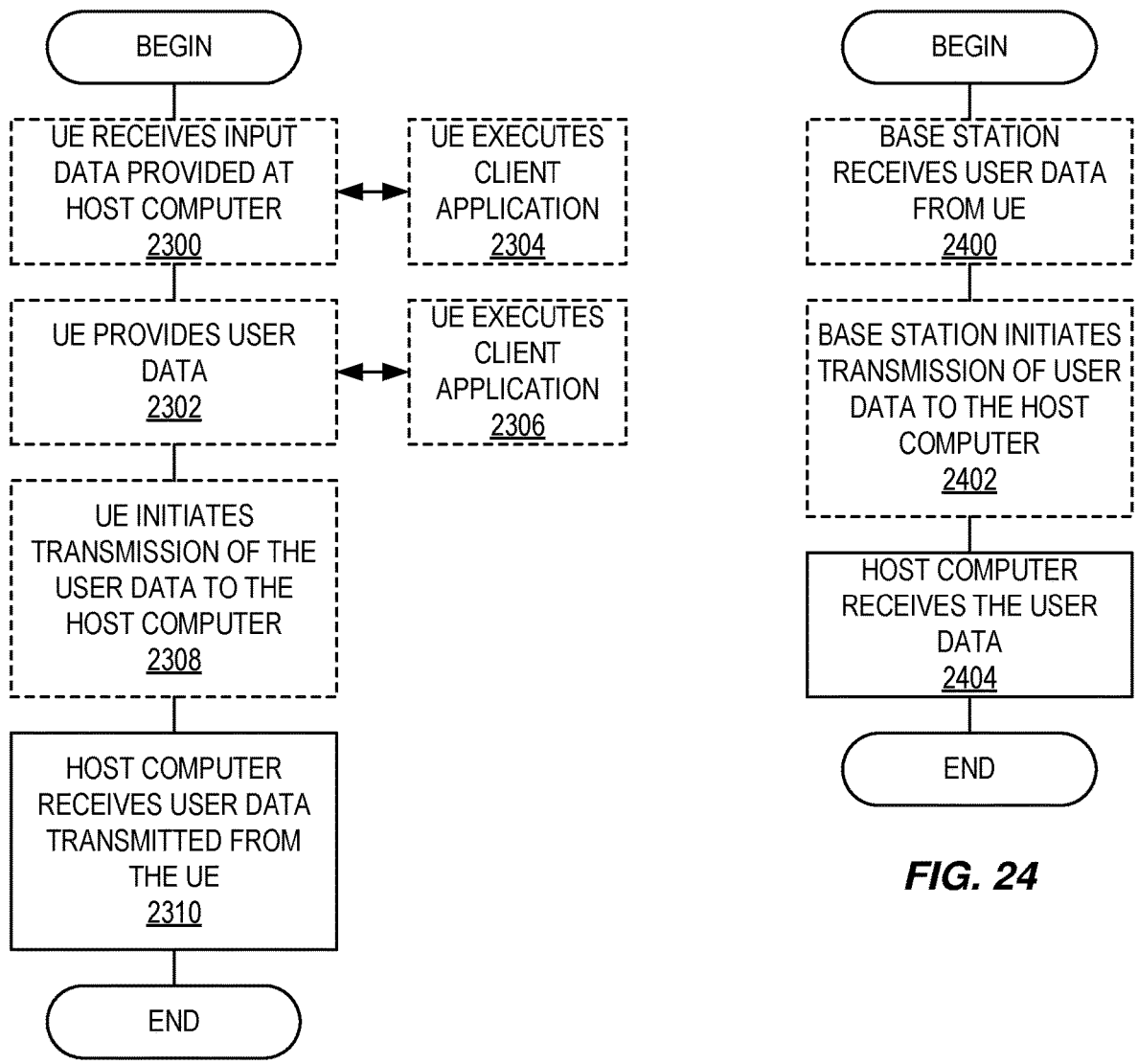
FIG. 23 is a flowchart illustrating a method implemented in a communication system, in accordance with some embodiments of the present disclosure.
FIG. 24 is a flowchart illustrating a method implemented in a communication system, in accordance with some embodiments of the present disclosure.

FIG. 23 is a flowchart illustrating a method implemented in a communication system, in accordance with some embodiments of the present disclosure. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with some embodiments of the present disclosure. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Certain embodiments may provide one or more of the following technical advantage(s). These advantages include having an assistive shared resource pool or SUL that can ensure K repetitions or transmission reliability; this approach can be better than multiple CGs as the latter may lead to high resource wastage than a shared resource allocation. Some example embodiments of the present disclosure are as follows. These examples are illustrative and not limiting.

Embodiment 1. A method performed by a User Equipment, UE, for operating in a Fifth Generation, 5G, network, the method comprising: receiving data to be transmitted as an uplink, UL, transmission in Configured Grant, CG, resources, the data to be transmitted in a Grant-Free, GF, transmission to be repeated K number of times within a CG period; determining that the number of Transmission Occasions, TOs, remaining within the CG resources and within a CG period for the UE is less than a target repetition number K; and either: transmitting the data within the remaining TOs within the CG resources and also transmitting the data within TOs within shared resources such that the transmission is repeated K number of times; or waiting until the beginning of the next CG period to transmit K number of times within the CG resources.

Embodiment 2. The method of embodiment 1 wherein, upon determining that that the number of TOs remaining within the CG resources and within a CG period for the UE is less than a target repetition number K, transmitting the data within the remaining TOs within the CG resources and also transmitting the data within TOs within shared resources such that the transmission is repeated K number of times.

Embodiment 3. The method of embodiment 2 wherein the CG period for the shared resources is either: aligned with the CG period for the CG resources; or offset or delayed in time relative to the CG period for the CG resources.

Embodiment 4. The method of embodiment 2 or 3 wherein the TOs within the CG resources and the shared resources are: contiguous with each other in the time domain; or are not contiguous with each other in the time domain.

Embodiment 5. The method of any of embodiments 2-4 wherein there is only one TO per time slot per Hybrid Automatic Repeat Request, HARQ, process.

Embodiment 6. The method of embodiment 5 wherein the CG period for the shared resources is offset relative to the CG period for the CG resources.

Embodiment 7. The method of embodiment 6 wherein the CG period for the shared resources does not begin until after the CG period for the CG resources.

Embodiment 8. The method of any of embodiments 2-7 wherein determining that that the number of TOs remaining within the CG resources and within a CG period for the UE is less than a target repetition number K further comprises determining that the number of TOs remaining within the CG resources and within a CG period for the UE is less than a threshold T.

Embodiment 9. A method performed by a User Equipment, UE, for operating in a Fifth Generation, 5G, network, the method comprising: receiving data to be transmitted as an uplink, UL, transmission in Configured Grant, CG, resources, the data to be transmitted in a Grant-Free, GF, transmission to be repeated K number of times within a CG period; determining that the number of Transmission Occasions, TOs, remaining within the CG resources and within a CG period for the UE is less than a target repetition number K; transmitting the data within the remaining TOs within the CG resources and also transmitting the data within TOs within shared resources such that the transmission is repeated L number of times, where L<K.

Embodiment 10. The method of embodiment 9 wherein the UE calculates a transmission power on at least one of a CG resource and a shared resource based on the value of L.

Embodiment 11. The method of embodiment 10 wherein the UE calculates a transmission power according to any of the power calculation equations disclosed herein.

Embodiment 12. A method performed by a New Radio, NR, NodeB, gNB, the method comprising: monitoring uplink, UL, transmissions by a User Equipment, UE, in Configured Grant, CG, resources, the data to be transmitted in a Grant-Free, GF, transmission to be repeated K number of times within a CG period; detecting that the UE is transmitting a GF transmission on CG resources; determining that the number of Transmission Occasions, TOs, remaining within the CG resources and within a CG period for the UE is less than the target repetition number K; and monitoring a shared resource for GF transmissions by the UE.

Embodiment 13. The method of embodiment 12 wherein the CG period for the shared resources is either: aligned with the CG period for the CG resources; or offset or delayed in time relative to the CG period for the CG resources.

Embodiment 14. The method of embodiment 12 or 13 wherein the TOs within the CG resources and the shared resources are: contiguous with each other in the time domain; or are not contiguous with each other in the time domain.

Embodiment 15. The method of any of embodiments 12-14 wherein there is only one TO per time slot per Hybrid Automatic Repeat Request, HARQ, process.

Embodiment 16. The method of embodiment 15 wherein the CG period for the shared resources is offset relative to the CG period for the CG resources.

Embodiment 17. The method of embodiment 16 wherein the CG period for the shared resources does not begin until after the CG period for the CG resources.

Embodiment 18. The method of any of embodiments 12-17 wherein determining that that the number of TOs remaining within the CG resources and within a CG period for the UE is less than a target repetition number K further comprises determining that the number of TOs remaining within the CG resources and within a CG period for the UE is less than a threshold T.

Embodiment 19. The method of embodiment 18 comprising determining whether to perform detection on the CG resources or on the shared resources based upon the value of T.

Embodiment 20. The method of embodiment 19 wherein determining whether to perform detection on the CG resources or on the shared resources based upon the value of T comprises using any algorithm for that purpose disclosed herein.

Embodiment 21. A wireless device for operating in a Fifth Generation, 5G, network, the wireless device comprising:

processing circuitry configured to perform any of the steps of any of the wireless device methods disclosed herein; and power supply circuitry configured to supply power to the wireless device.

Embodiment 22. A base station operating in a Fifth Generation, 5G, network, the base station comprising: processing circuitry configured to perform any of the steps of any of the base station methods disclosed herein; and power supply circuitry configured to supply power to the base station.

Embodiment 23. A User Equipment, UE, operating in a Fifth Generation, 5G, network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the wireless device methods disclosed herein; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 24. A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the base station methods disclosed herein.

Embodiment 25. The communication system of the previous embodiment further including the base station.

Embodiment 26. The communication system of the previous 2 embodiments, further including the UE, wherein the UE is configured to communicate with the base station.

Embodiment 27. The communication system of the previous 3 embodiments, wherein: the processing circuitry of the host computer is configured to execute a host application, thereby providing the user data; and the UE comprises processing circuitry configured to execute a client application associated with the host application.

Embodiment 28. A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the base station methods disclosed herein.

Embodiment 29. The method of the previous embodiment, further comprising, at the base station, transmitting the user data.

Embodiment 30. The method of the previous 2 embodiments, wherein the user data is provided at the host computer by executing a host application, the method further comprising, at the UE, executing a client application associated with the host application.

Embodiment 31. A User Equipment, UE, configured to communicate with a base station, the UE comprising a radio interface and processing circuitry configured to perform the method of the previous 3 embodiments.

Embodiment 32. A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the UE methods disclosed herein.

Embodiment 33. The communication system of the previous embodiment, wherein the cellular network further includes a base station configured to communicate with the UE.

Embodiment 34. The communication system of the previous 2 embodiments, wherein: the processing circuitry of the host computer is configured to execute a host application, thereby providing the user data; and the UE's processing circuitry is configured to execute a client application associated with the host application.

Embodiment 35. A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the UE methods disclosed herein.

Embodiment 36. The method of the previous embodiment, further comprising at the UE, receiving the user data from the base station.

Embodiment 37. A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the UE methods disclosed herein.

Embodiment 38. The communication system of the previous embodiment, further including the UE.

Embodiment 39. The communication system of the previous 2 embodiments, further including the base station, wherein the base station comprises a radio interface configured to communicate with the UE and a communication interface configured to forward to the host computer the user data carried by a transmission from the UE to the base station.

Embodiment 40. The communication system of the previous 3 embodiments, wherein: the processing circuitry of the host computer is configured to execute a host application; and the UE's processing circuitry is configured to execute a client application associated with the host application, thereby providing the user data.

Embodiment 41. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 42. A method implemented in a communication system including a host computer, a base station, and a User Equipment, UE, the method comprising: at the host computer, receiving user data transmitted to the base station from the UE, wherein the UE performs any of the steps of any of the UE methods disclosed herein.

Embodiment 43. The method of the previous embodiment, further comprising, at the UE, providing the user data to the base station.

Embodiment 44. The method of the previous 2 embodiments, further comprising: at the UE, executing a client application, thereby providing the user data to be transmitted; and at the host computer, executing a host application associated with the client application.

Embodiment 45. The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 46. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the base station methods disclosed herein.

Embodiment 47. The communication system of the previous embodiment further including the base station.

Embodiment 48. The communication system of the previous 2 embodiments, further including the UE, wherein the UE is configured to communicate with the base station.

Embodiment 49. The communication system of the previous 3 embodiments, wherein: the processing circuitry of the host computer is configured to execute a host application; and the UE is configured to execute a client application associated with the host application, thereby providing the user data to be received by the host computer.

Embodiment 50. A method implemented in a communication system including a host computer, a base station, and a User Equipment, UE, the method comprising: at the host computer, receiving, from the base station, user data originating from a transmission which the base station has received from the UE, wherein the UE performs any of the steps of any of the UE methods disclosed herein.

Embodiment 51. The method of the previous embodiment, further comprising at the base station, receiving the user data from the UE.

Embodiment 52. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| ACK | Acknowledgement |
| AF | Application Function |
| AMF | Access and Mobility Management Function |
| AN | Access Network |
| AP | Access Point |
| ASIC | Application Specific Integrated Circuit |
| AUSF | Authentication Server Function |
| BPRE | Bits Per Resource Element |
| BW | Bandwidth |
| BWP | Bandwidth Part |
| CE | Control Element |
| CG | Configured Grant |
| CP | Cyclic Prefix |
| CPU | Central Processing Unit |
| DCI | Downlink Control Information |
| DL | Downlink |
| DMRS | Demodulation Reference Signal |
| DN | Data Network |
| DSP | Digital Signal Processor |
| eNB | Enhanced or Evolved Node B |
| FPGA | Field Programmable Gate Array |
| GF | Grant-Free |
| gNB | New Radio Base Station |
| HARQ | Hybrid Automatic Repeat Request |
| IP | Internet Protocol |
| LTE | Long Term Evolution |
| MAC | Medium Access Control |
| MCS | Modulation and Coding Scheme |
| MME | Mobility Management Entity |
| MTC | Machine Type Communication |
| NACK | Negative Acknowledgement |
| NEF | Network Exposure Function |
| NF | Network Function |
| NR | New Radio |
| NRF | Network Repository Function |
| NSSF | Network Slice Selection Function |
| OTT | Over-the-Top |
| PCF | Policy Control Function |
| PDCP | Packet Data Convergence Protocol |
| P-GW | Packet Data Network Gateway |
| PUSCH | Physical Uplink Shared Channel |
| QoS | Quality of Service |
| RACH | Random Access Channel |
| RAM | Random Access Memory |
| RAN | Radio Access Network |
| RNTI | Radio Network Temporary Identifier |
| ROM | Read Only Memory |
| RRC | Radio Resource Control |
| RRH | Remote Radio Head |
| RTT | Round Trip Time |
| SCEF | Service Capability Exposure Function |
| SCH | Shared Channel |
| SFN | System Frame Number |
| SLIV | Start and Length Indicator Value |
| SMF | Session Management Function |
| SPS | Semi-Persistent Scheduling |
| SRS | Sounding Reference Signal |
| SUL | Supplemental Uplink |
| TDD | Time Division Duplexing |
| TO | Transmission Occasion or Transmission Opportunity |
| TRP | Transmission/Reception Point |
| TTI | Transmission Time Interval |
| UDM | Unified Data Management |
| UE | User Equipment |
| UL | Uplink |
| URLLC | Ultra-Reliable and Low-Latency Communications |
| UTRA | Universal Terrestrial Radio Access |
| UTRAN | Universal Terrestrial Radio Access Network |

Those skilled in the art will recognize improvements and modifications to the embodiments of the present disclosure. All such improvements and modifications are considered within the scope of the concepts disclosed herein.

REFERENCES

[1] 3GPP, "Study on Communication for Automation in Vertical Domains (Release 16)," 3GPP Technical Report (TR) 22.804, Version 16.1.0, September 2018

[2] 3GPP, "Service requirements for the 5G system; Stage 1 (Release 16)," 3GPP TS 22.261, Version 16.5.0, September 2018

[3] 3GPP, "NR; Physical layer procedures for data (Release 15)," 3GPP TS 38.214, Version 15.3.0, September 2018

[4] ETSI MCC, "R2-1801701: Report of 3GPP TSG RAN2 #100 meeting, Reno, Nevada, USA," 3GPP TSG-RAN WG2 meeting #101, February 26-Mar. 2, 2018, Athens, Greece

[5] Ericsson, "R1-1812162: Enhancement of Configured Grant for NR URLLC," 3GPP TSG-RAN1 Meeting #95, Nov. 12-16, 2018, Spokane, USA

What is claimed is:

1. A method performed by a User Equipment, UE, for operating in a Fifth Generation, 5G, network, the method comprising:
   receiving data to be transmitted as an uplink, UL, transmission in Configured Grant, CG, resources, the data to be transmitted K number of times within a CG period for the CG resources;
   determining that a number of Transmission Occasions, TOs, remaining within the CG resources and within the CG period for the UE is less than K; and
   transmitting the data within the remaining TOs within the CG resources and also transmitting the data within TOs within shared resources, which are separate from the CG resources.

2. The method of claim 1 comprising, upon determining that that the number of TOs remaining within the CG resources and within the CG period for the UE is less than K, transmitting the data within the remaining TOs within the CG resources and also transmitting the data within the TOs within the shared resources such that the transmission is performed at least K number of times.

3. The method of claim 2 wherein a CG period for the shared resources is either:
   aligned with the CG period for the CG resources; or
   offset or delayed in time relative to the CG period for the CG resources.

4. The method of claim 2 wherein the TOs within the CG resources and the shared resources are:
   contiguous with each other in a time domain; or
   are not contiguous with each other in the time domain.

5. The method of claim 2 wherein there is only one TO per time slot per Hybrid Automatic Repeat Request, HARQ, process.

6. The method of claim 2 wherein transmitting the data within the TOs within the shared resources comprises transmitting the data in a location that is chosen randomly, deterministically, or semi-deterministically.

7. The method of claim 2 wherein transmitting the data within the TOs within the shared resources such that the transmission is performed at least K number of times comprises performing the transmission L number of times, where L>K.

8. The method of claim 7 wherein a value of L is determined based on a reliability of the shared resources.

9. The method of claim 1 wherein the transmission is repeated L number of times, where L<K; and the transmitting within either the CG resources, the shared resources, or both occurs with an increased transmit power.

10. A method performed by a New Radio, NR, base station, gNB, the method comprising:
    monitoring uplink, UL, transmissions by a User Equipment, UE, in Configured Grant, CG, resources, for data to be transmitted K number of times within a CG period for the CG resources;
    detecting that the UE is transmitting on CG resources;
    determining that a number of Transmission Occasions, TOs, within the CG resources and within the CG period for the UE for transmitting the data will be less than K; and
    monitoring a shared resource, which is separate from the CG resources, for Grant-Free, GF, transmissions of the data by the UE.

11. The method of claim 10 wherein a CG period for the shared resources is either:
    aligned with the CG period for the CG resources; or
    offset or delayed in time relative to the CG period for the CG resources.

12. The method of claim 10 wherein the TOs within the CG resources and the shared resources are:
    contiguous with each other in a time domain; or
    are not contiguous with each other in the time domain.

13. The method of claim 10 wherein there is only one TO per time slot per Hybrid Automatic Repeat Request, HARQ, process.

14. The method of claim 10 wherein determining that that the number of TOs within the CG resources and within the CG period for the UE will be less than K further comprises determining that the number of TOs remaining within the CG resources and within the CG period for the UE is less than a threshold T.

15. A wireless device for operating in a Fifth Generation, 5G, network, the wireless device comprising:
    power supply circuitry configured to supply power to the wireless device; and
    processing circuitry configured to:
       receive data to be transmitted as an uplink, UL, transmission in Configured Grant, CG, resources, the data to be transmitted K number of times within a CG period for the CG resources;
       determine that a number of Transmission Occasions, TOs, remaining within the CG resources and within the CG period for the UE is less than K; and
       transmit the data within the remaining TOs within the CG resources and also transmit the data within TOs within shared resources, which are separate from the CG resources.

16. The wireless device of claim 15, wherein the processing circuitry is further configured to:
    repeat the transmission L number of times, where L<K; and
    transmit within either the CG resources, the shared resources, or both with increased transmit power.

17. The wireless device of claim 15, wherein the processing circuitry is further configured to:
    transmit the data within the TOs within the shared resources whereby the data is transmitted in a location that is chosen randomly, deterministically, or semi-deterministically.

18. A base station operating in a Fifth Generation, 5G, network, the base station comprising:
    power supply circuitry configured to supply power to the base station; and
    processing circuitry configured to:
       monitor uplink, UL, transmissions by a User Equipment, UE, in Configured Grant, CG, resources, for data to be transmitted K number of times within a CG period for the CG resources;
       detect that the UE is transmitting on CG resources;
       determine that a number of Transmission Occasions, TOs, within the CG resources and within the CG period for the UE for transmitting the data will be less than K; and
       monitor a shared resource, which is separate from the CG resources, for Grant-Free, GF, transmissions of the data by the UE.

19. The base station according to claim 18, the processing circuitry is further configured to:
   determine that that the number of TOs within the CG resources and within the CG period for the UE will be less than K; and
   determine that the number of TOs remaining within the CG resources and within the CG period for the UE is less than a threshold T.

* * * * *